(12) United States Patent
Yamaguchi et al.

(10) Patent No.: US 10,726,814 B2
(45) Date of Patent: Jul. 28, 2020

(54) IMAGE DISPLAY APPARATUS, IMAGE PROCESSING APPARATUS, IMAGE DISPLAY METHOD, IMAGE PROCESSING METHOD, AND STORAGE MEDIUM

(71) Applicant: CANON KABUSHIKI KAISHA, Tokyo (JP)

(72) Inventors: Hiroichi Yamaguchi, Sagamihara (JP); Hikaru Uchidate, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 15/880,333

(22) Filed: Jan. 25, 2018

(65) Prior Publication Data
US 2018/0218714 A1 Aug. 2, 2018

(30) Foreign Application Priority Data
Jan. 27, 2017 (JP) .................................. 2017-013239

(51) Int. Cl.
*G09G 5/38* (2006.01)
*G06T 3/00* (2006.01)
*G06T 5/00* (2006.01)
*G06T 19/00* (2011.01)
*G02B 27/01* (2006.01)
*G09G 3/00* (2006.01)

(52) U.S. Cl.
CPC ........... *G09G 5/38* (2013.01); *G02B 27/0172* (2013.01); *G02B 27/0179* (2013.01); *G06T 3/0006* (2013.01); *G06T 5/006* (2013.01); *G06T 19/006* (2013.01); *G09G 3/002* (2013.01); *G02B 2027/011* (2013.01); *G02B 2027/014* (2013.01); *G09G 2320/0261* (2013.01)

(58) Field of Classification Search
None
See application file for complete search history.

(56) References Cited

U.S. PATENT DOCUMENTS 5,825,456 A * 10/1998 Tabata ................. H04N 13/344
351/201
6,088,006 A * 7/2000 Tabata ................. H04N 13/275
345/7
8,836,720 B2 9/2014 Oyama et al.
(Continued)

FOREIGN PATENT DOCUMENTS

JP 2011-085712 A 4/2011
JP 2011-139158 A 7/2011
(Continued)

*Primary Examiner* — Jwalant Amin
(74) *Attorney, Agent, or Firm* — Canon U.S.A., Inc. IP Division

(57) ABSTRACT

The present disclosure changes a position of a combined image relative to a display unit in at least one of a horizontal and a vertical direction of the display unit based on information about a position and an orientation at the time of combined image display on the display unit and information about a position and an orientation of an image display apparatus at the time of image capturing by an imaging unit. In this case, the present disclosure changes the position of the combined image such that a moving amount of the combined image falls within a predetermined range in at least one of the horizontal and the vertical directions of the display unit.

24 Claims, 25 Drawing Sheets

(56) References Cited

U.S. PATENT DOCUMENTS

| | | | |
|---|---|---|---|
| 2005/0041156 A1* | 2/2005 | Kondo | H04N 5/145 348/700 |
| 2011/0304710 A1* | 12/2011 | Ito | A63F 13/65 348/51 |
| 2012/0050141 A1* | 3/2012 | Border | G02B 27/017 345/8 |
| 2012/0113307 A1* | 5/2012 | Watanabe | H04N 5/23219 348/333.01 |
| 2013/0058414 A1* | 3/2013 | Tsuru | H04N 19/176 375/240.16 |
| 2017/0323479 A1* | 11/2017 | Mokuya | G06T 19/00 |
| 2017/0329480 A1* | 11/2017 | Ishikawa | G06F 3/0484 |
| 2020/0027281 A1* | 1/2020 | Mukasa | G06T 19/00 |

FOREIGN PATENT DOCUMENTS

| | | |
|---|---|---|
| JP | 2015-231106 A | 12/2015 |
| WO | 2016088420 A1 | 6/2016 |

* cited by examiner

FIG.8A 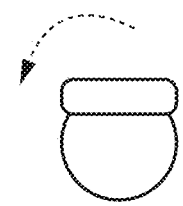 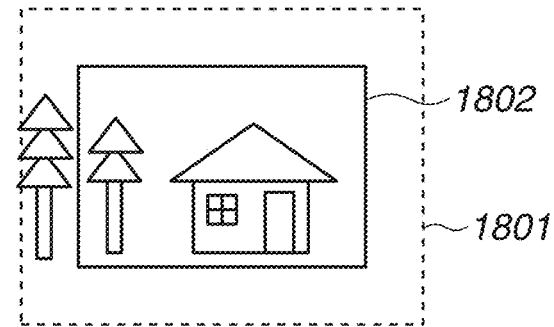

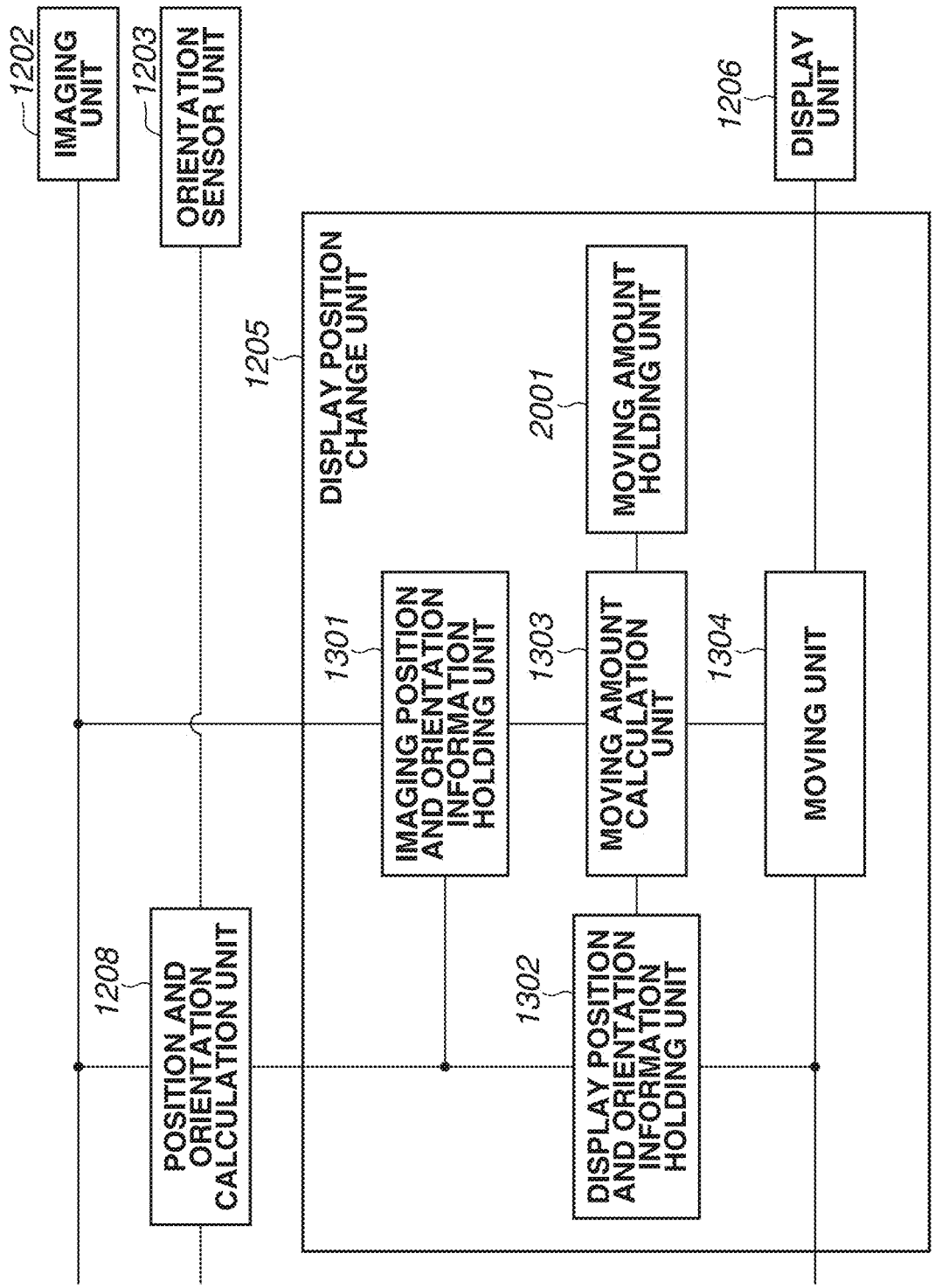

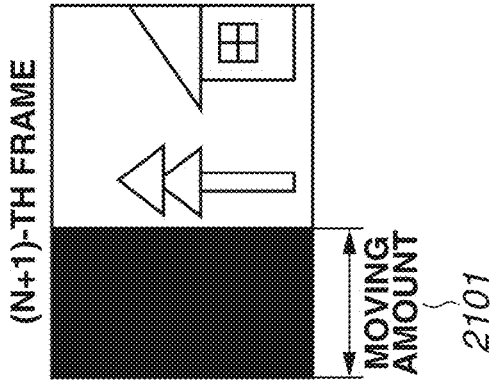
FIG.11B
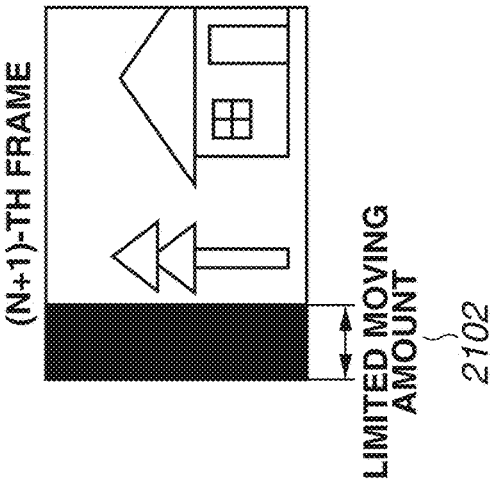
FIG.11C
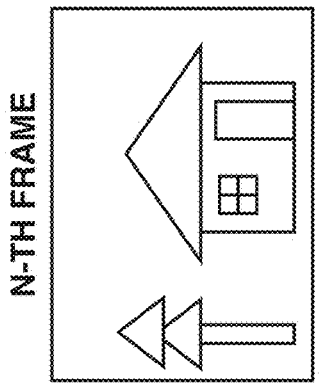
FIG.11A
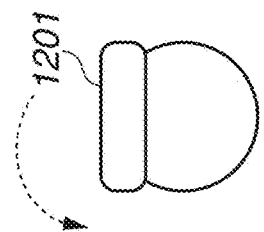

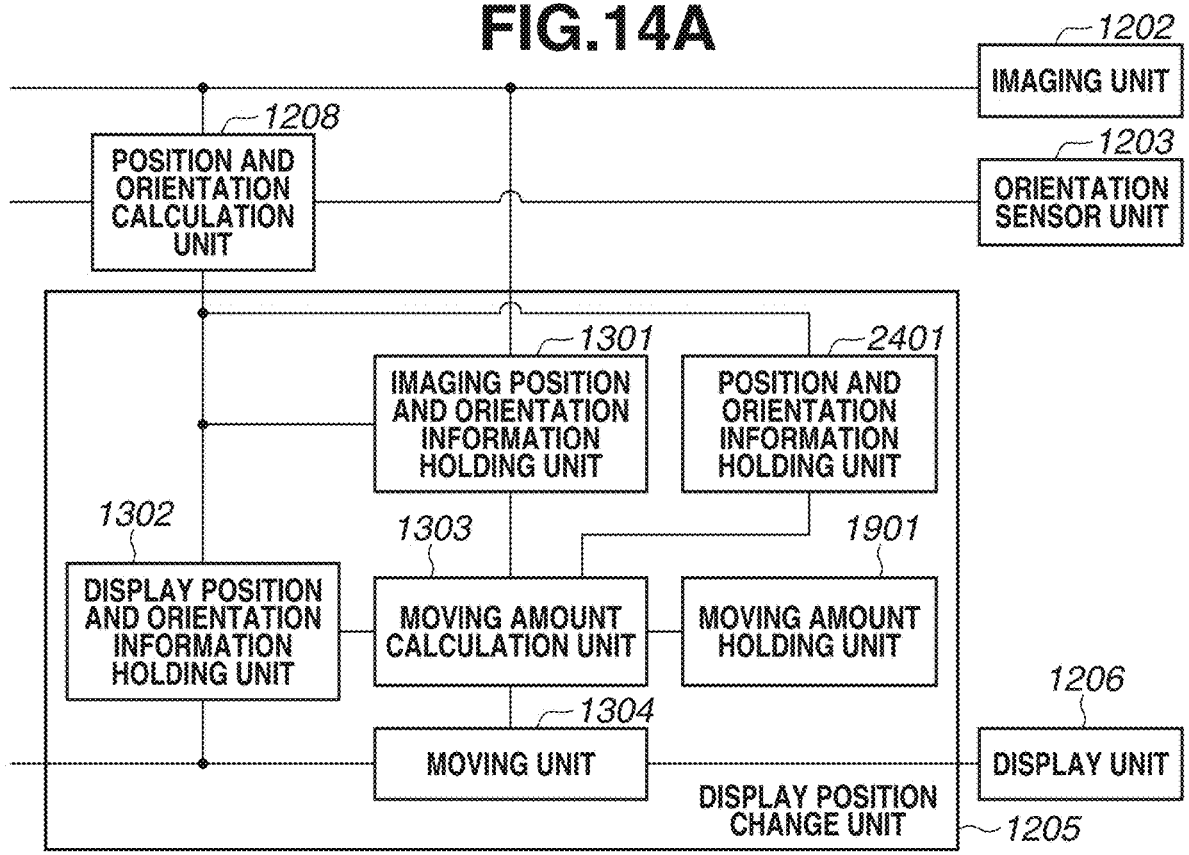
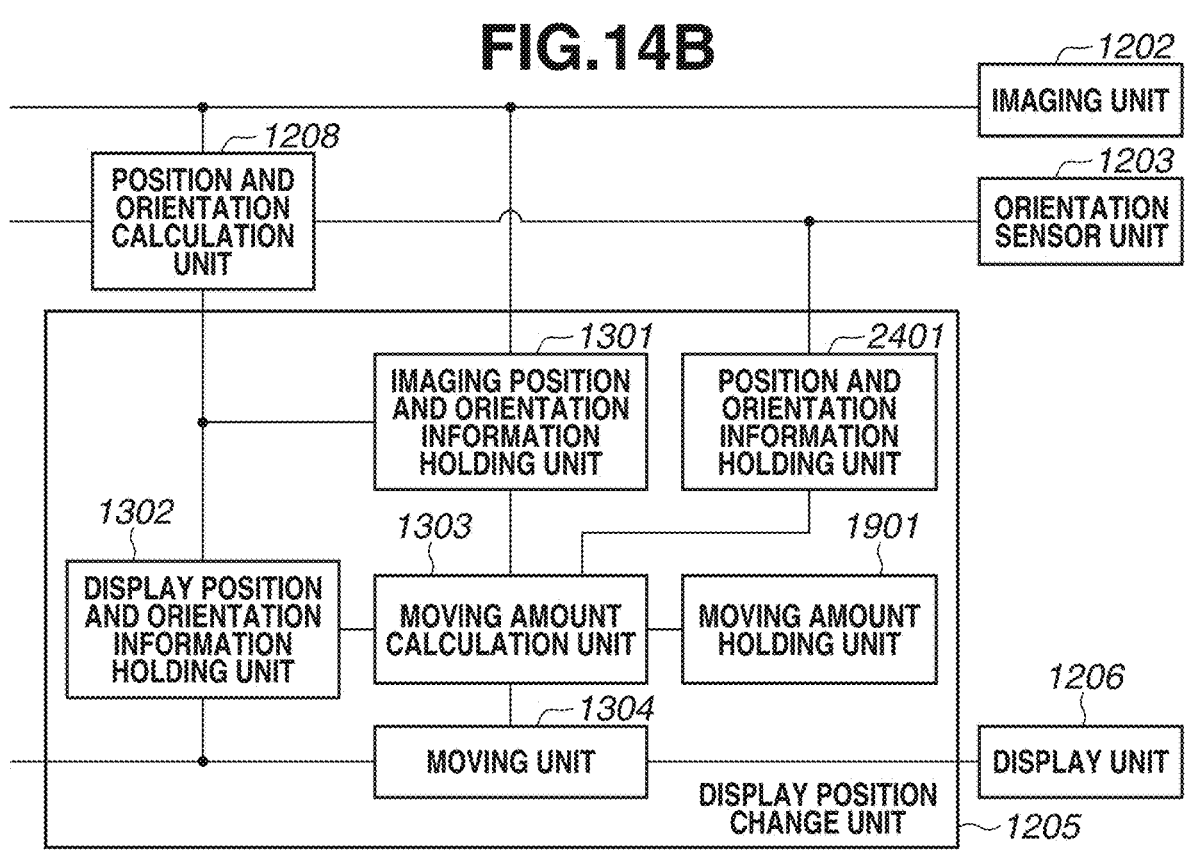

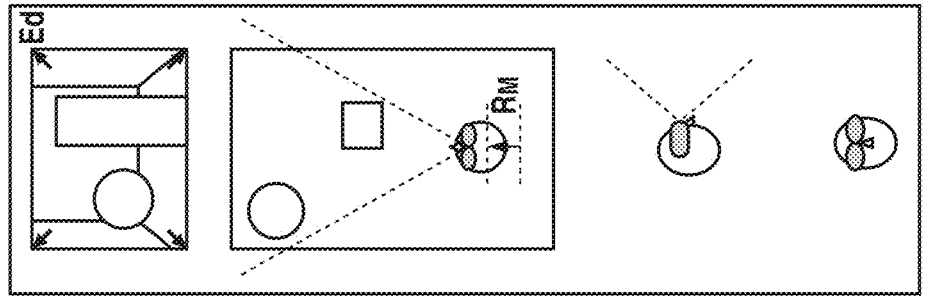
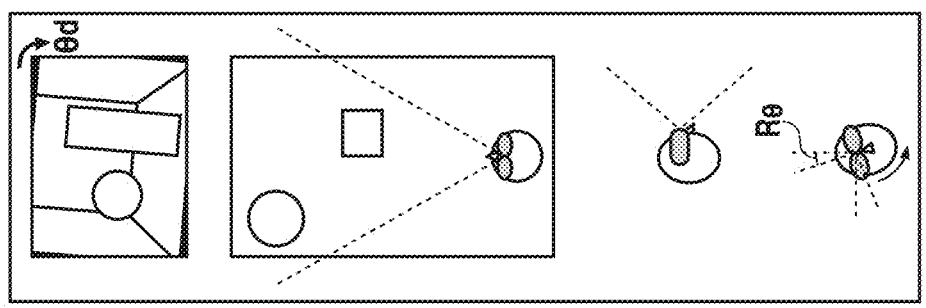
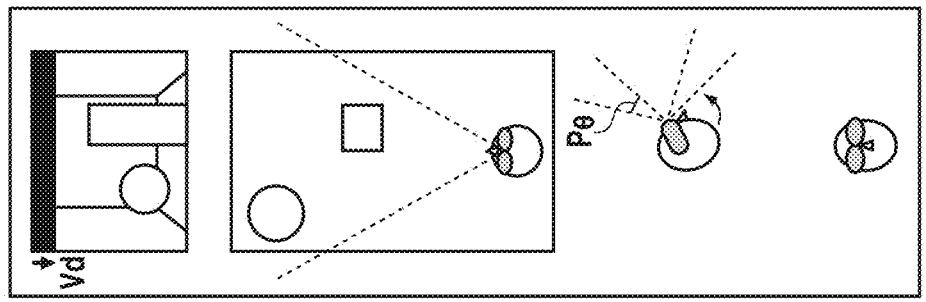
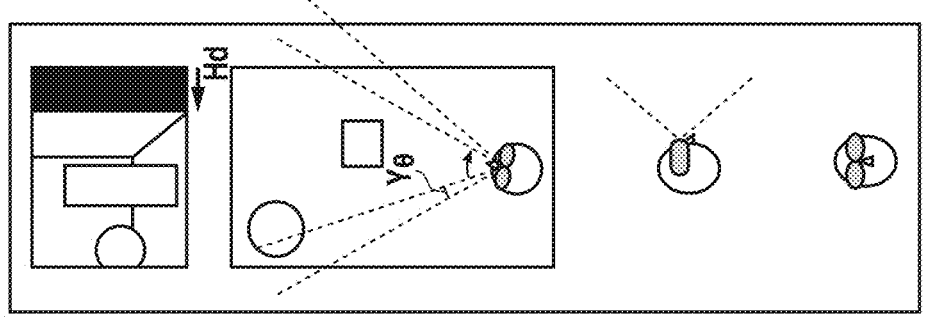
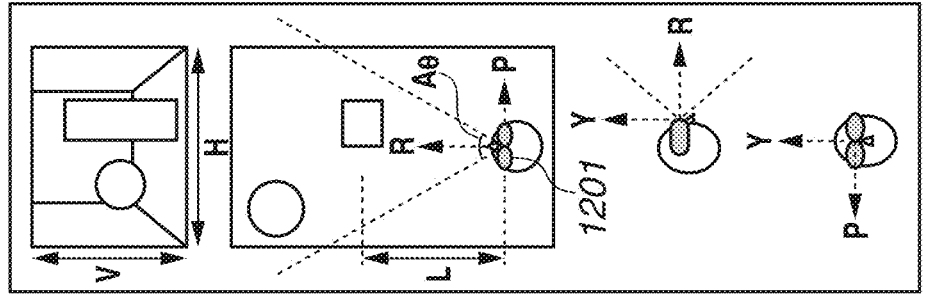

WHEN HEAD DOES NOT MOVE

WHEN HEAD MOVES IN Yaw MOTION

IMAGE DISPLAY APPARATUS, IMAGE PROCESSING APPARATUS, IMAGE DISPLAY METHOD, IMAGE PROCESSING METHOD, AND STORAGE MEDIUM

BACKGROUND

Field of the Disclosure

The present disclosure relates to techniques for an image display apparatus mounted on the head of a user for using the apparatus.

Description of the Related Art

In recent years, Mixed Reality (MR) is known as a technology for seamlessly mixing the real world and a virtual world in real time. One of MR technologies is known to utilize a video see-through head mounted display (HMD). This technology captures an image of a subject which approximately coincides with a subject viewed from the pupil position of a HMD user, by using a video camera, and allows the HMD user to view the captured image with a computer graphics (CG) image superimposed thereon.

A video see-through HMD is configured to capture an image of a subject by using a charge coupled device (CCD) sensor to obtain digital image data of the subject, and present to a wearer a mixed reality (MR) image with a CG image superimposed thereon, via a display device such as a liquid crystal display or an organic electroluminescence (EL) display. In addition to a HMD, the above-described configuration includes an external apparatus (image processing apparatus) to which the HMD transmits an image captured by the HMD. The external apparatus calculates the position and orientation of the HMD based on the captured image received from the HMD, superimposes a CG image on the captured image based on the calculation result, and transmits a superposition image to the HMD. The HMD displays the superposition image received from the external apparatus. Thus, the HMD user can experience a MR space by wearing the HMD.

The above-described system performs a series of processing. More specifically, the HMD serving as an image display apparatus, including an imaging unit, captures an image and transmits the captured image to the external apparatus, and then the external apparatus superimposes a CG image on the captured image and transmits the superposition image to the HMD. Therefore, there arises a delay time between the time when the HMD captures an image of the real space and the time when the image is displayed. If the HMD user changes the orientation of the head during the delay time, an inconsistency occurs between the image in real space the HMD user faces and the image of the real space displayed on the HMD. Japanese Patent Application Laid-Open No. 2015-231106 discusses a technique of performing processing, such as CG image superposition, on an image captured by a HMD, obtaining the position and orientation of the head of a HMD user, and correcting and displaying an image based on the position and orientation. When correcting the image so that the direction the HMD user faces accords with the direction of the image of the real space displayed on the HMD, the technique discussed in Japanese Patent Application Laid-Open No. 2015-231106 repeats data on an outer edge portion of the image in a portion that is not captured by the HMD.

However, when the technique discussed in Japanese Patent Application Laid-Open No. 2015-231106 performs processing for repeating data on an outer edge portion of the image in a portion that is not captured by the image display apparatus including an imaging unit, if the area for the processing is large with respect to the portion, the user of the image display apparatus including an imaging unit may feel a strong strangeness.

SUMMARY

According to an aspect of the present disclosure, an image display apparatus includes an imaging unit configured to capture an image of a real space, a transmission unit configured to transmit the captured image to an image processing apparatus, a reception unit configured to receive from the image processing apparatus a combined image generated based on the captured image and a virtual image by the image processing apparatus, and a change unit configured to change a position of the combined image relative to a display unit in at least one of a horizontal and a vertical direction of the display unit based on information about a position and an orientation of the image display apparatus when the received combined image is displayed on the display unit, and information about a position and an orientation of the image display apparatus when the imaging unit has captured the image. The change unit changes the position of the combined image such that a moving amount of the combined image falls within a predetermined range in at least one of the horizontal and the vertical directions of the display unit.

Further features of the present disclosure will become apparent from the following description of exemplary embodiments with reference to the attached drawings.

BRIEF DESCRIPTION OF THE DRAWINGS

FIGS. 8A, 8B, 8C, 8D, and 8E illustrate a modification of the combined image movement control according to an exemplary embodiment of the subject disclosure.

FIG. 10 is a block diagram illustrating functions of a display position change unit according to an exemplary embodiment of the subject disclosure FIGS. 11A, 11B, and 11C illustrate combined image movement control according to an exemplary embodiment of the subject disclosure.

FIGS. 14A and 14B are block diagrams illustrating functions of a display position change unit according to an exemplary embodiment of the subject disclosure.

FIGS. 20A, 20B, 20C, 20D, and 20E illustrate effects of the image conversion unit according to an exemplary embodiment of the subject disclosure.

DESCRIPTION OF THE EMBODIMENTS

Figure 1:
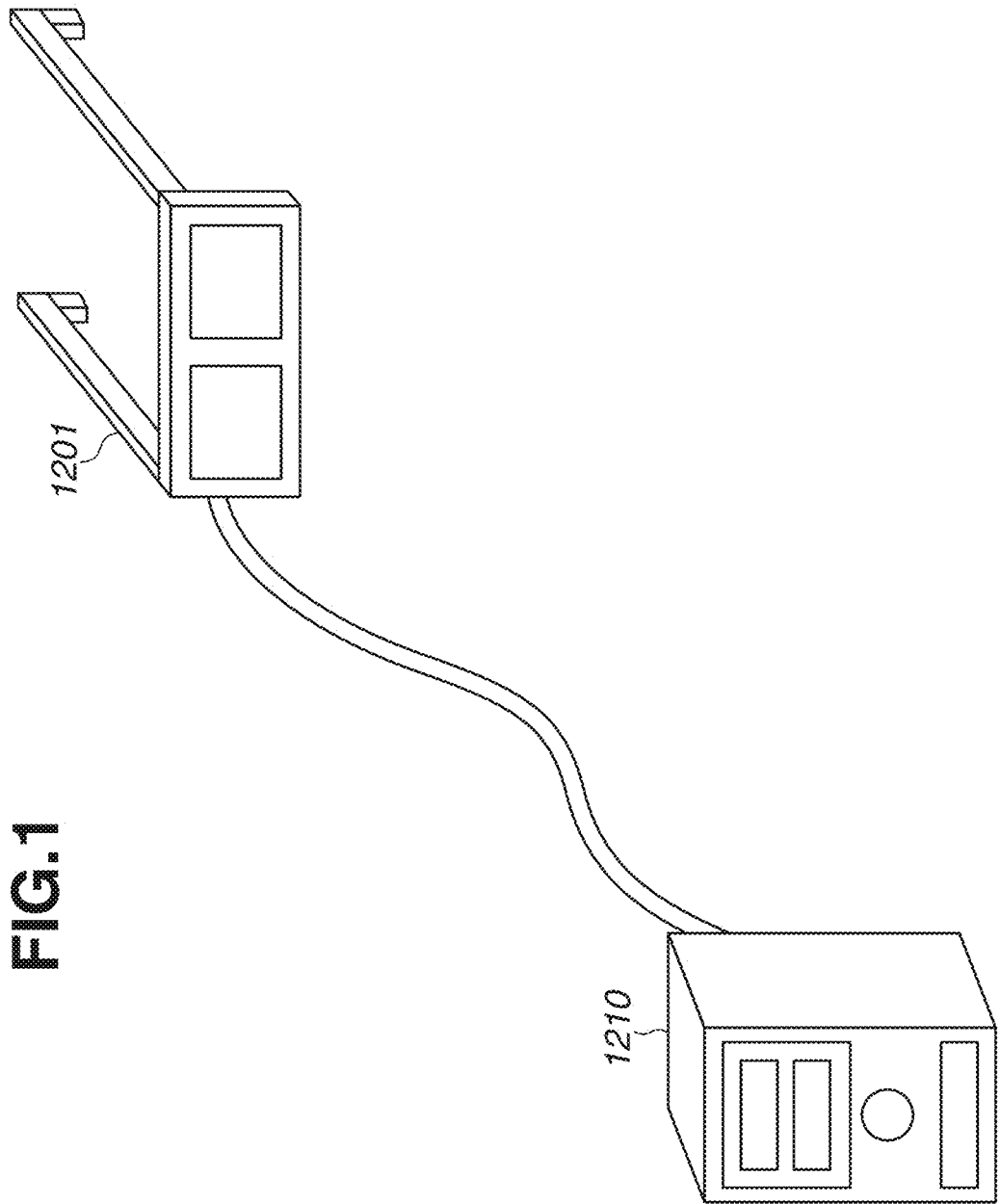
FIG. 1 is a schematic view illustrating an image processing system according to an exemplary embodiment of the subject disclosure.

A first exemplary embodiment of the present disclosure will be described in detail below with reference to the accompanying drawings. FIG. 1 schematically illustrates an image processing system according to the present exemplary embodiment. As illustrated in FIG. 1, the system according to the present exemplary embodiment includes a head mounted image display apparatus (hereinafter referred to as a HMD) 1201 and an image processing apparatus 1210.

The HMD 1201 is mounted on the user's head and includes an image display unit, a communication unit for communicating with the image processing apparatus 1210, and a control unit for controlling these units. The image display unit displays an image generated by the image processing apparatus 1210. The image display unit includes optical systems and is configured in such a manner that the optical systems are disposed in front of the user's eyes.

The HMD 1201 and the image processing apparatus 1210 are connected via a cable. Although the image processing system according to the present exemplary embodiment performs communication via a cable-based wired communication path, a wireless communication path may also be used instead of a cable.

The image processing apparatus 1210 is connected with an external interface (I/F) apparatus (not illustrated) having a keyboard for inputting data and commands. Input data and command results are displayed on an external display apparatus.

Figure 2:
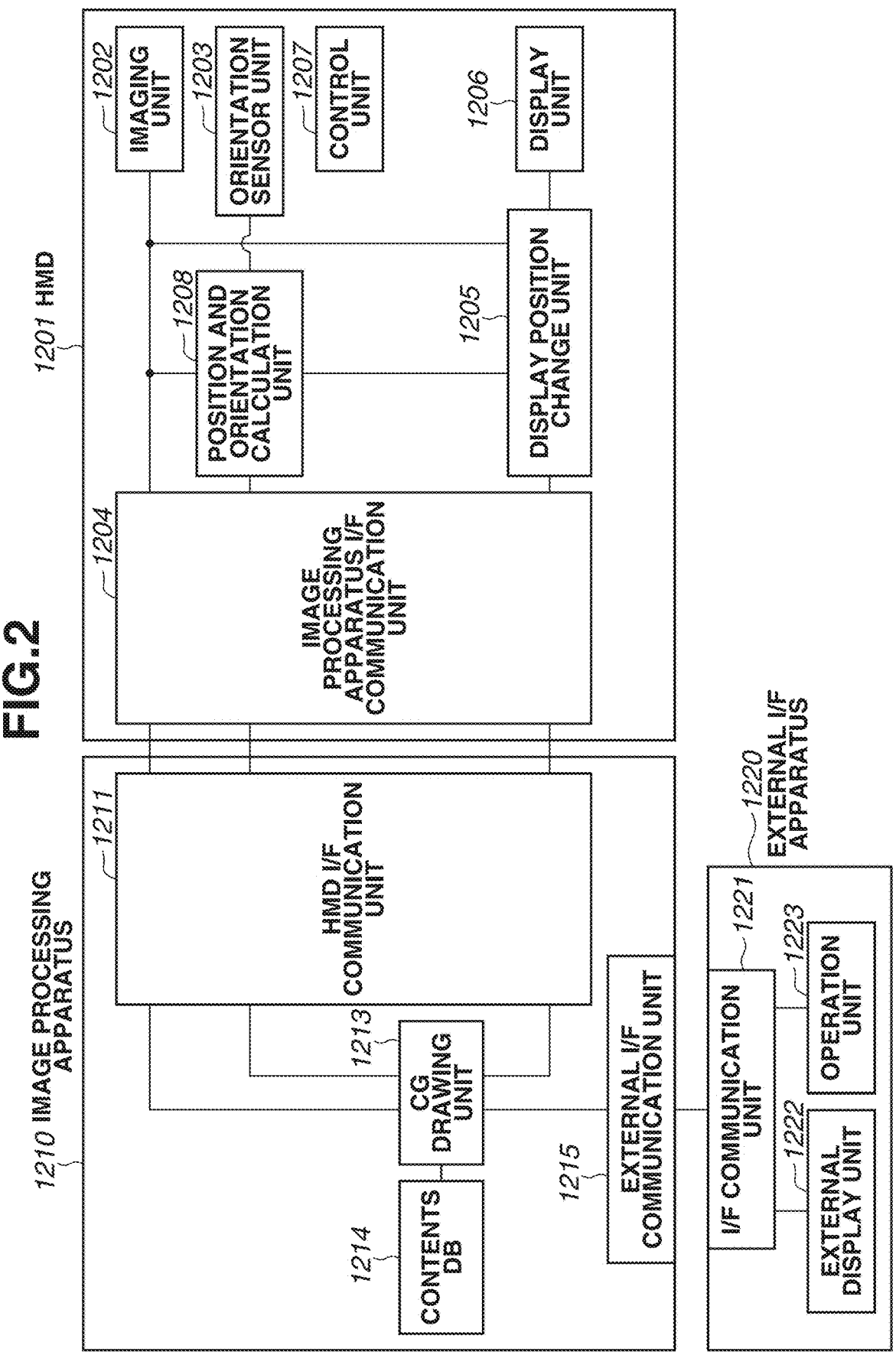
FIG. 2 is a block diagram illustrating a configuration of the image processing system according to an exemplary embodiment of the subject disclosure.

FIG. 2 is a block diagram illustrating functions of the image processing system according to the present exemplary embodiment. The HMD 1201 includes an imaging unit 1202 for capturing an image of the real space, a display unit 1206 for displaying an image to be presented to the HMD user, and an image processing apparatus I/F communication unit 1204 for transmitting and receiving images and control signals. The HMD 1201 also includes an orientation sensor unit 1203 for measuring the orientation of the HMD 1201, a display position change unit 1205 for processing (moving) a combined image received from the image processing apparatus 1210, a position and orientation calculation unit 1208 for calculating the position and orientation of the HMD 1201, a control unit 1207, and other function units (not illustrated).

The image processing apparatus 1210 is configured as an external apparatus such as a personal computer (PC) or a workstation (WS), which is different from the HMD 1201. The image processing apparatus 1210 includes a HMD I/F communication unit 1211 for transmitting and receiving images and control signals, and a contents DB 1214 for storing CG contents of a virtual image. The image processing apparatus 1210 also includes a CG drawing unit 1213 for superimposing a CG image stored in the contents DB 1214 on an image captured by the imaging unit 1202 to generate a combined image, an external I/F communication unit 1215 for performing communication with an external I/F apparatus, and other function units (not illustrated).

Each of the HMD 1201 and the image processing apparatus 1210 include a central processing unit (CPU), a read only memory (ROM), a random access memory (RAM), a hard disk drive (HDD), and other hardware components. When the CPU executes a program stored in the ROM or the HDD, each functional configuration and processing of each flowchart are implemented. The RAM includes a storage area which functions as a work area in which the CPU loads and executes a program. The ROM includes an area for storing a program to be executed by the CPU. The HDD includes an area for storing various programs required for the CPU to perform processing, and various kinds of data including data related to threshold values.

An external I/F apparatus 1220 displays a video image received from the image processing apparatus 1210, and is operated when the user uses the image processing apparatus 1210. More specifically, the external I/F apparatus 1220 includes an I/F communication unit 1221 for communicating with the image processing apparatus 1210, an external display apparatus 1222 for displaying a video image, an operation unit 1223 for performing an operation, and other function units (not illustrated).

Although, in the present exemplary embodiment, the HMD 1201 transmits a captured image and position and orientation information to the image processing apparatus 1210 which superimposes a CG image as a virtual image on the captured image, the configuration is not limited thereto. For example, the image processing apparatus 1210 may transmit only a CG image as a virtual image to the HMD 1201, and the HMD 1201 superimposes the CG image on the captured image, or the position and orientation calculation unit 1208 may be mounted on the image processing apparatus 1210.

In the above-described configuration, the image of the real space captured by the imaging unit 1202 of the HMD 1201 and the position and orientation information of the HMD calculated by the position and orientation calculation unit 1208 are transmitted to the image processing apparatus 1210 via the image processing apparatus I/F communication unit 1204.

The CG drawing unit 1213 of the image processing device 1210 draws a CG image based on the received position and orientation information, and superimposes the CG image on the image captured by the imaging unit 1202 to generate a combined image. Then, the CG drawing unit 1213 transmits the combined image to the HMD 1201 via the HMD I/F communication unit 1211. The HMD 1201 displays on the display unit 1206 the combined image received from the image processing apparatus 1210. The above-described configuration allows the user wearing the HMD 1201 to view the combined image composed of the captured image with the CG image (drawn by the image processing apparatus 1210) superimposed thereon.

The HMD 1201 also transmits the combined image drawn by the CG drawing unit 1213 to the external I/F apparatus 1220 via the external I/F communication unit 1215. The external I/F apparatus 1220 displays on the external display apparatus 1222 the combined image received via the I/F communication unit 1221. The image that is the same as the image displayed on the display unit 1206 of the HMD 1201 is also displayed on the external display apparatus 1222.

Figure 3:
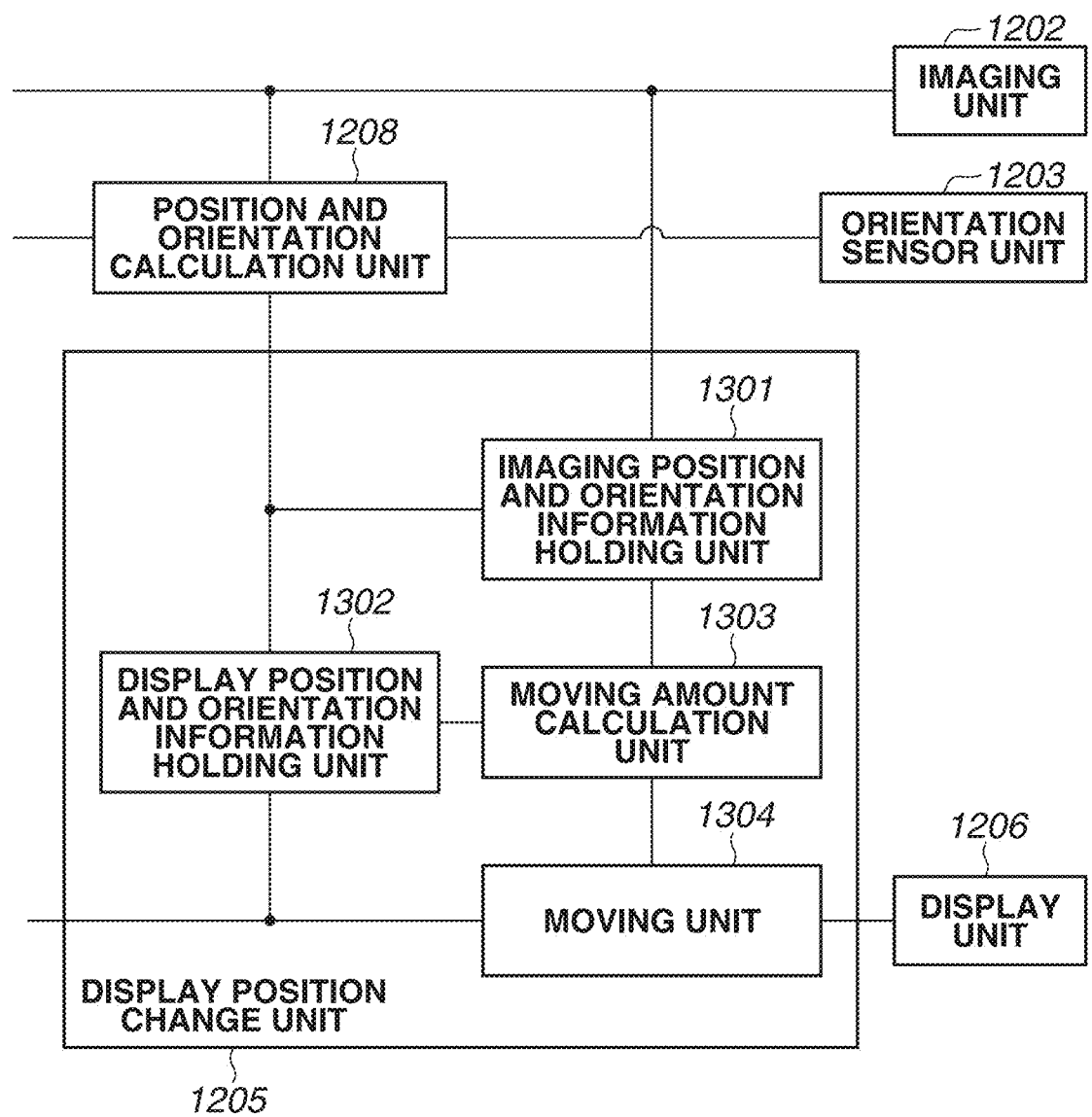
FIG. 3 is a block diagram illustrating functions of a display position change unit according to an exemplary embodiment of the subject disclosure

FIG. 3 is a block diagram illustrating a functional configuration of the display position change unit 1205 according to the present exemplary embodiment. The imaging position and orientation information holding unit 1301 acquires the position and orientation information of the HMD 1201 at the time of image capturing by the HMD 1201 from the position and orientation calculation unit 1208, and holds the information. The display position and orientation information holding unit 1302 acquires the position and orientation information of the HMD 1201 at the time of reception of a display target image, from the position and orientation calculation unit 1208, and holds the information. The moving amount calculation unit 1303 calculates in which direction and how much the HMD 1201 has moved since the imaging unit 1202 of the HMD 1201 has captured an image of the real space until the captured image is displayed. Then, based on the calculated moving amount, the moving amount calculation unit 1303 calculates how much the image needs to be moved. More specifically, the moving amount calculation unit 1303 performs this calculation based on the position and orientation information at the time of image capturing of the real space, acquired from the imaging position and orientation information holding unit 1301, and the position and orientation information at the time of captured image display, acquired from the display position and orientation information holding unit 1302. As for the position and orientation information at the time of captured image display, the moving amount calculation unit 1303 may use the latest position and orientation information calculated by the position and orientation calculation unit 1208 as the position and orientation when displaying the captured image. Alternatively, the moving amount calculation unit 1303 may estimate the position and orientation at the time of image display on the display unit 1206 and use the estimated position and orientation information. Then, based on the calculation result, the moving amount calculation unit 1303 calculates the number of pixels over which the display target image is to be moved. A movement unit 1304 moves the display target image by the calculated number of pixels and displays the combined image on the display unit 1206.

Figure 4:
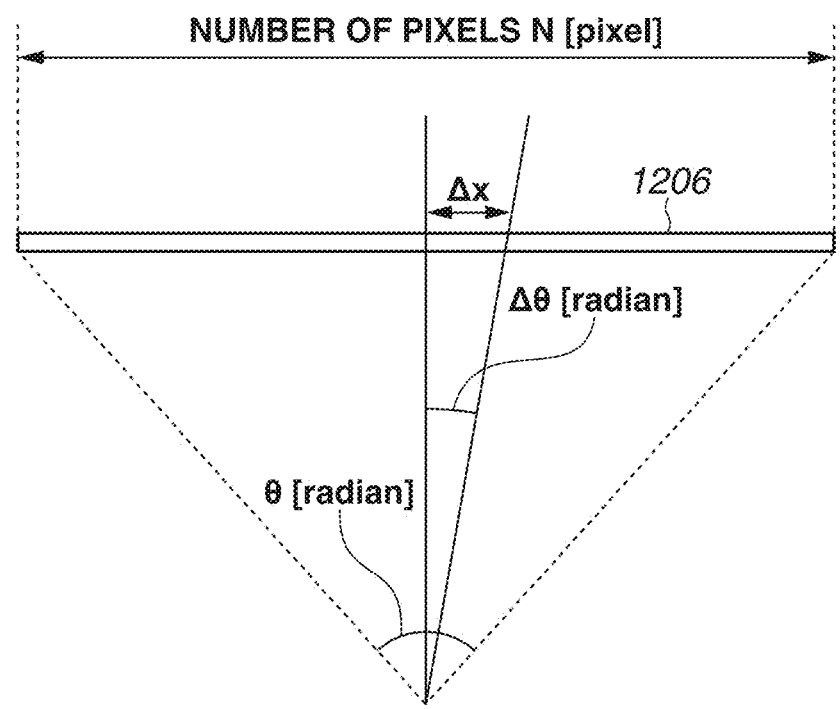
FIG. 4 illustrates a method of calculating variation of a position and an orientation according to an exemplary embodiment of the subject disclosure

The following describes a method used when the moving amount calculation unit 1303 calculates the number of pixels corresponding to variation of the position and orientation of the HMD 1201. FIG. 4 illustrates a method of calculating the number of pixels corresponding to variation (movement angle) of the position and orientation. FIG. 4 illustrates a movement when the HMD user shakes the head in the lateral direction, where θ [radian] denotes the horizontal angle of view when the HMD user views the display unit 1206. The moving amount calculation unit 1303 calculates the number of pixels corresponding to variation of the position and orientation with reference to the center of the display unit 1206, where Δθ [radian/frame] denotes the angle for movement per frame, Δx [pixel] denotes the number of pixels corresponding to the movement, N [pixel] denotes the number of pixels on the display unit 1206, and θ [radian] denotes the angle of view with which the HMD user can view the display unit 1206. In this case, Δx [pixel], the number of pixels corresponding to movement, can be calculated by using the following Formula 1. Δx [pixel] in the vertical direction can also be calculated by using a similar formula.

$$\Delta x = N/2/\tan(\theta/2)*\tan(\Delta\theta) \quad \text{(Formula 1)}$$

The movement unit 1304 moves the display target combined image for the display unit 1206 by the moving amount (number of pixels) calculated by the moving amount calculation unit 1303 based on the Formula 1, and then displays the image.

According to the present exemplary embodiment, if the moving amount calculated by the formula 1 exceeds a predetermined range (a range between an upper limit and a lower limit), the movement unit 1304 changes the moving amount so that the moving amount falls within the predetermined range.

Figure 5A:
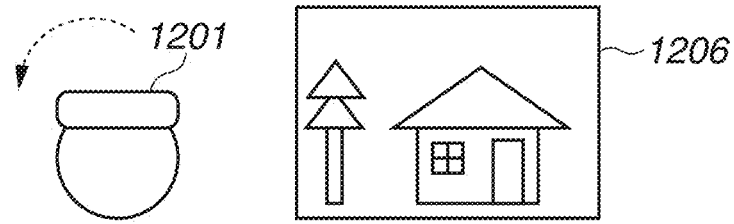
FIGS. 5A, 5B, 5C, 5D, 5E, and 5F illustrate combined image movement control according to an exemplary embodiment of the subject disclosure.
Figure 5B:
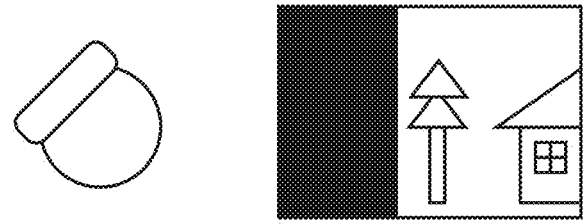
Figure 5C:
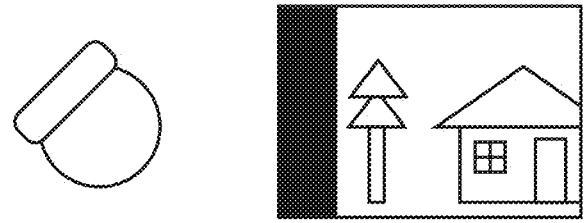

FIGS. 5A to 5F illustrate combined image movement control by the display position change unit 1205 according to the present exemplary embodiment, particularly when the display position change unit 1205 controls the movement in such a manner that the movement of the combined image falls within the upper limit of the predetermined range. Referring to FIGS. 5A to 5F, the drawing on the left illustrates the user wearing the HMD 1201 when viewed from the top, and the drawing on the right illustrates an image displayed on the display unit 1206. FIG. 5A illustrates the HMD user who is not moving, and an image displayed on the HMD 1201. FIG. 5B illustrates the HMD user who shakes the head to the left, and an image displayed without limiting the moving amount as in the conventional technique. FIG. 5C illustrates the HMD user who shakes the head to the left, similar to FIG. 5B, and an image displayed with the limited moving amount according to the present exemplary embodiment.

According to the present exemplary embodiment, the combined image to be received from the image processing apparatus 1210 has the same size (same angle of view) as the image to be displayed on the display unit 1206 of the HMD 1201. Therefore, when the display target image for the display unit 1206 is moved according to the movement of the HMD 1201, a black area occurs in which nothing is displayed. According to the conventional technique (FIG. 5B), when the combined image is moved and displayed without limiting the moving amount, a large black area occurs in the display unit 1206, making the HMD user feel a strong strangeness.

On the other hand, according to the present exemplary embodiment (FIG. 5C), the moving amount is limited in such a manner that the moving amount falls within the predetermined range. Therefore, a black area occurring on the display unit 1206 is restrained to a certain size even when the HMD 1201 largely moves. Thus, the present exemplary embodiment makes it possible to reduce a strangeness felt by the HMD user.

Figure 5D:
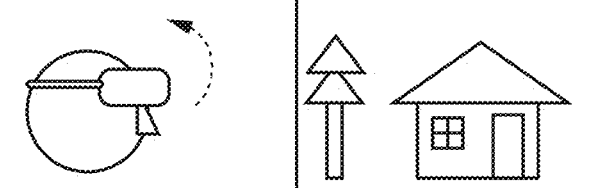
Figure 5E:
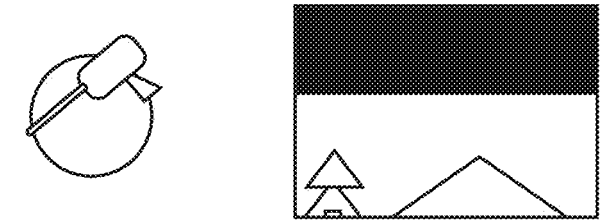
Figure 5F:
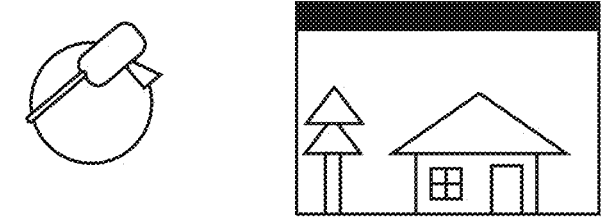

This also applies to a case where the eye direction of the HMD user is vertically changed as illustrated in FIGS. 5D to 5F. Referring to FIGS. 5D to 5F, the drawing on the left illustrates the user wearing the HMD 1201 when viewed from the side, and the drawing on the right illustrates an image displayed on the display unit 1206. According to the present exemplary embodiment, since the vertical movement is limited, a black area is restrained to a certain size even when the HMD 1201 is largely moved, as illustrated in FIG. 5F. This makes it possible to reduce a strangeness felt by the HMD user.

Figure 6A:
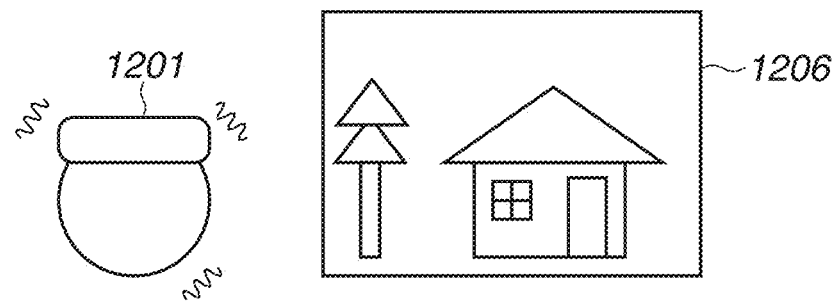
FIGS. 6A, 6B, and 6C illustrate the combined image movement control according to an exemplary embodiment of the subject disclosure FIG. 7 schematically illustrates limitations of the moving amount in the movement control according to an exemplary embodiment of the subject disclosure
Figure 6B:
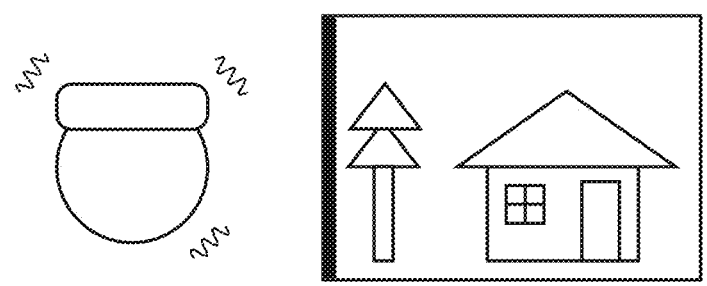
Figure 6C:
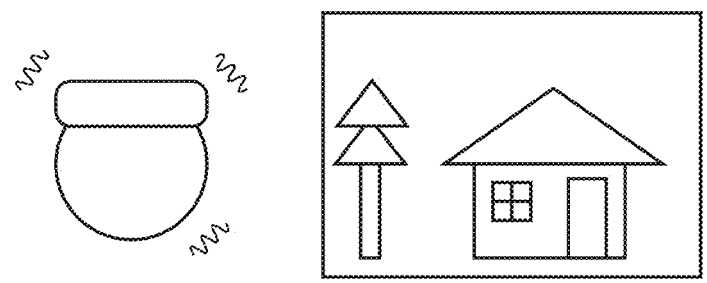

FIGS. 6A to 6C illustrate the combined image movement control by the display position change unit 1205 according to the present exemplary embodiment, particularly when the display position change unit 1205 controls the movement of the combined image in such a manner that the movement falls within the predetermined lower range. Referring to FIGS. 6A to 6C, the drawing on the left illustrates the user wearing the HMD 1201 when viewed from the top, and the drawing on the right illustrates an image displayed on the display unit 1206. The HMD 1201 may slightly move even when the HMD user tries to make the HMD 1201 stationary, or the position and orientation calculation unit 1208 may detect a slight change of the position and orientation of the HMD 1201 although the HMD user is keeping the HMD 1201 stationary. For example, when the HMD 1201 slightly moves, the combined image is displayed on the display unit 1206, as illustrated in FIG. 6A if the display position change unit 1205 does not perform the movement control. According to the conventional technique (FIG. 6B), when the combined image is moved and displayed without limiting the moving amount, a black area is displayed on the display unit 1206 although there is almost no effect by the movement control. This makes the HMD user feel a strangeness. According to the present exemplary embodiment, the moving amount is limited so as to fall within the predetermined range. In this case, the display position change unit 1205 does not perform the movement control if the moving amount falls below the predetermined lower range, as illustrated in FIG. 6C. This control prevents the occurrence of a black area, making it possible to reduce a strangeness felt by the HMD user.

Figure 7:
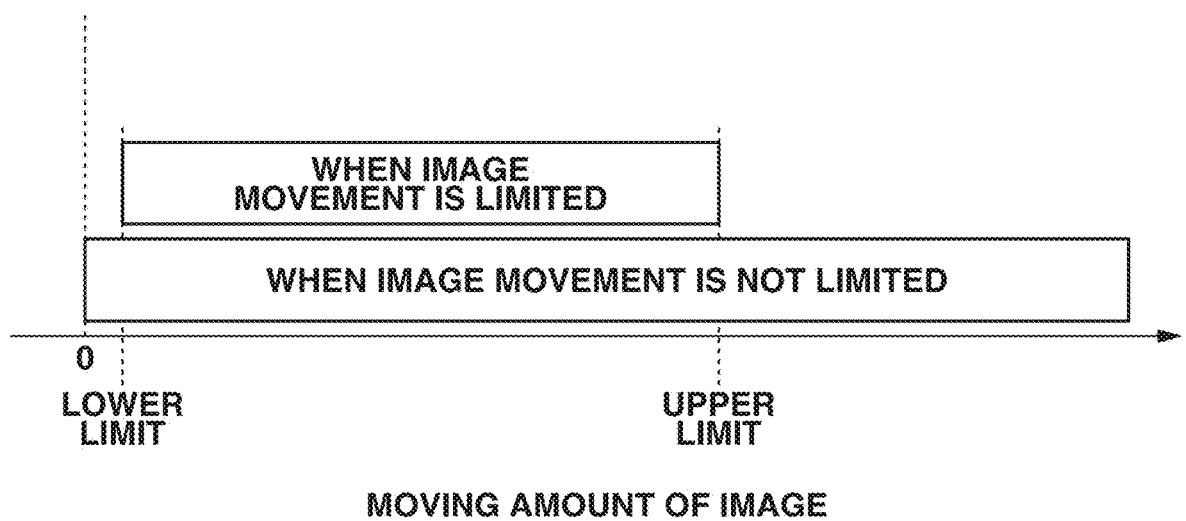

FIG. 7 schematically illustrates limitations of the moving amount when the movement control as illustrated in FIGS. 5A to 6C is performed. The horizontal axis denotes the moving amount of an image. Setting an upper limit and a lower limit of the image movement enables reduction of the movable amount of the image. The upper and lower limits may be set separately in the horizontal and the vertical directions, and the predetermined range may be differentiated between the horizontal and the vertical directions.

Figure 9:
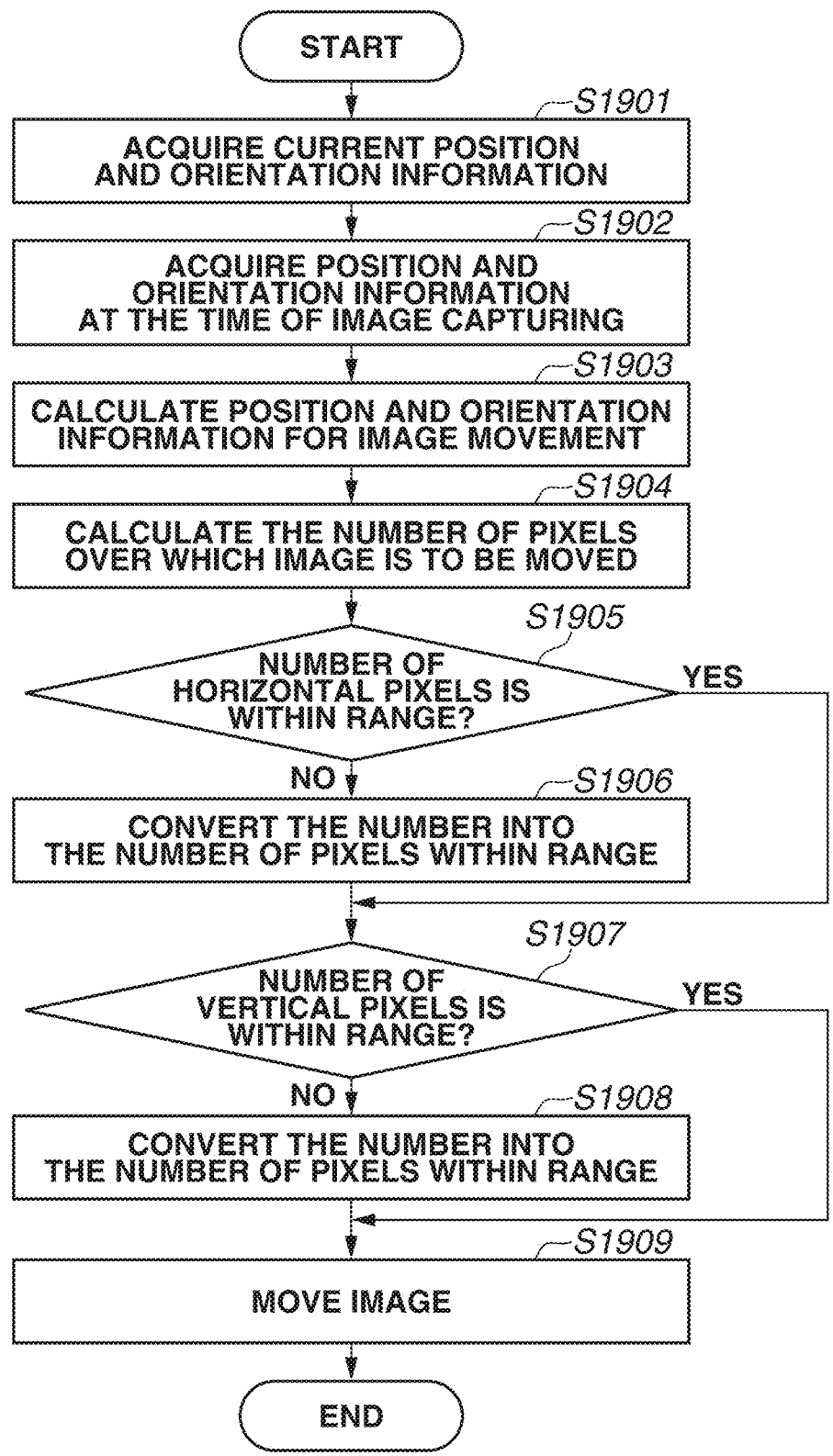
FIG. 9 is a flowchart illustrating the combined image movement control according to an exemplary embodiment of the subject disclosure.

FIG. 9 is a flowchart illustrating image processing performed in combined image movement control according to the present exemplary embodiment. In step S1901, the display position and orientation information holding unit 1302 acquires the position and orientation information at the time of reception of the combined image generated by the image processing apparatus 1210, from the position and orientation calculation unit 1208, and transmits the information to the moving amount calculation unit 1303.

In step S1902, the moving amount calculation unit 1303 acquires from the imaging position and orientation information holding unit 1301 the position and orientation information at the time of capturing of the background image of the combined image received from the image processing apparatus 1210 by the imaging unit 1202. The imaging position and orientation information holding unit 1301 acquires from the position and orientation calculation unit 1208 the position and orientation information at the time of image capturing of the real space by the imaging unit 1202, and holds the information. Various conventional techniques can be used as a method of associating the image received from the image processing apparatus 1210 with the capture timing by the imaging unit 1202. For example, the method can be implemented by supplying an identifier to the header of an image or embedding an identifier in the image. Although, in the present exemplary embodiment, the position and orientation information is held by the HMD 1201, the position and orientation information may also be recorded in the header of the image or embedded in image information.

In step S1903, the moving amount calculation unit 1303 calculates how much the position and orientation has changed based on the position and orientation information at the time of reception of the combined image from the image processing apparatus 1210 and the position and orientation information at the time of capturing of the background image of the combined image.

In step S1904, based on variation of the position and orientation calculated in step S1903, the moving amount calculation unit 1303 calculates in which direction and how much the image is to be moved (the horizontal moving amount and the vertical moving amount). In step S1905, the moving amount calculation unit 1303 determines whether the horizontal moving amount calculated in step S1904 is within a predetermined range. When the horizontal moving amount is out of the predetermined range (NO in step S1905), the processing proceeds to step S1906. In step S1906, the moving amount calculation unit 1303 converts the horizontal moving amount into a moving amount within the predetermined range. More specifically, when the moving amount exceeds an upper limit, the moving amount calculation unit 1303 changes the moving amount to the upper limit. On the other hand, when the moving amount is less than a lower limit, the moving amount calculation unit 1303 changes the moving amount to the lower limit.

In step S1907, the moving amount calculation unit 1303 determines whether the vertical moving amount calculated in step S1904 is less than a predetermined range. When the vertical moving amount is out of the predetermined range (NO in step S1907), the processing proceeds to step S1908. In step S1908, the moving amount calculation unit 1303 converts the vertical moving amount into a moving amount within the predetermined range, similar to step S1906.

In step S1909, the movement unit 1304 moves the combined image by the moving amounts calculated in steps S1906 and S1908 and displays the combined image on the display unit 1206. The horizontal threshold values (upper and lower limits) and the vertical threshold values (upper and lower limits) used in steps S1905 and S1907 may be respective predetermined values or values input by the user via the operation unit 1223 serving as a user interface of the external I/F apparatus 1220. These threshold values may be changed during operation of the system and may be changed via the operation unit 1223.

According to the present exemplary embodiment, when the display position of the generated combined image relative to the display unit 1206 is moved based on the position and orientation information at the time of image capturing by the imaging unit 1202 and the position and orientation information at the time of combined image display on the display unit 1206, the combined image is moved such that the moving amount falls within a predetermined range. This makes it possible to reduce a strangeness felt by the HMD user who views the image displayed on the display unit 1206.

Although, in the above descriptions, the moving amount is changed so as to fall within the predetermined range having an upper limit and a lower limit, either one of the upper and lower limits may be set. More specifically, the moving amount may be changed so as not to exceed the upper limit if only the upper limit is set, and so as not to fall below the lower limit if only the lower limit is set. Although, in the above descriptions, the display position change unit 1205 performs the movement control for moving the display position of the combined image in both the horizontal and the vertical directions, the movement control may be performed only in either one direction.

In the above descriptions, the moving amount calculation unit 1303 determines whether the calculated moving amount falls within a predetermined range, and, when the moving amount is out of the predetermined range, changes the moving amount to the upper or the lower limit. However, the configuration of the present exemplary embodiment is not limited thereto. For example, the movement unit 1304 may determine whether the moving amount calculated by the moving amount calculation unit 1303 falls within a predetermined range, and, when the moving amount is out of the predetermined range, move the combined image so that the moving amount equals the upper or the lower limit. In any case, according to the present exemplary embodiment, it is necessary that the moving amount of the display target combined image for the display unit 1206 falls within the predetermined range.

Although, in the above descriptions, a black image is displayed in a portion out of the range of the image captured by the imaging unit 1202, an image of another color may be displayed. In addition, as in the descriptions in Japanese Patent Application Laid-Open No. 2015-231106, the image at an end of a captured image may be repetitively displayed.

Modification of First Exemplary Embodiment

In the above descriptions, the angle of view of the image captured by the imaging unit 1202 coincides with the angle of view of the image displayed by the display unit 1206. However, the angle of view of the image of the imaging unit 1202 is larger (wider) than the angle of view of the image of the display unit 1206 as a modification, and therefore, an extraction unit (not illustrated) may clip (extract) a part of the image captured by the imaging unit 1202 and display the image on the display unit 1206. FIGS. 8A to 8E illustrate an example of the movement control in this configuration.

Referring to FIG. 8A, the drawing on the left illustrates the user wearing the HMD 1201 when viewed from the top, and the drawing on the right illustrates a combined image 1801 composed of the image captured by the imaging unit 1202 with a CG image superimposed thereon and an area 1802 to be partly clipped and displayed on the display unit 1206. According to the present modification, the image processing apparatus 1210 superimposes a CG image on the captured image with the angle of view of the image of the imaging unit 1202 to generate a combined image, and transmits the combined image to the HMD 1201. The HMD 1201 controls the area to be clipped (extracted) based on the position and orientation information at the time of image capturing by the imaging unit 1202 and the position and orientation information at the time of combined image display on the display unit 1206.

Figure 8B:
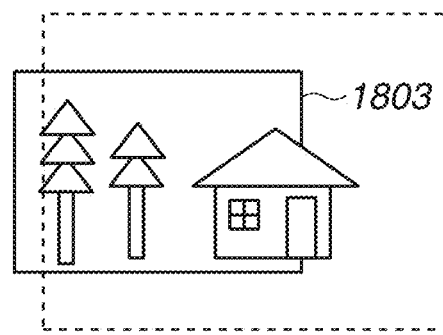
Figure 8C:
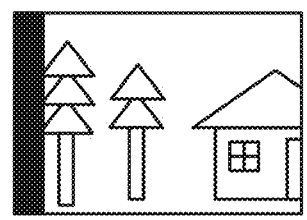
Figure 8D:
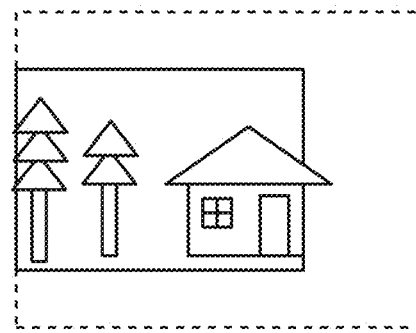

FIG. 8B illustrates an area 1803 to be clipped from the combined image 1801 when the HMD user largely moves the eye direction to the left in a case where the clipping position is not limited as in the conventional technique. Since the HMD user moves the eye direction to the left compared with FIG. 8A, the movement unit 1304 moves the clipping position in the combined image 1801 to the left. In this case, with a large moving amount of the HMD 1201, the clipping position exceeds the range of the angle of view of the image of the imaging unit 1202, and the combined image includes a range that is not captured by the imaging unit 1202. Therefore, as illustrated in FIG. 8C, a black area occurs in the image displayed on the display unit 1206. The moving amount refers to the difference between the clipping position of a part of the image and the initial position thereof.

Figure 8E:
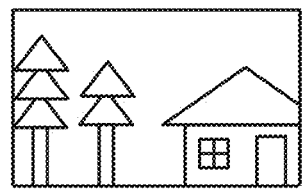

According to the present exemplary embodiment, on the other hand, limiting the moving amount in clipping position control enables limitation of a clipping area 1804 within the range of the combined image 1801 even with a large moving amount of the HMD 1201. This makes it possible to prevent a black area from occurring in the display target combined image on the display unit 1206, as illustrated in FIG. 8E. In this case, an upper limit is set to the moving amount to prevent the occurrence of a black area. However, in a case where a black area occurs, an upper limit may be set to restrict the size of the black area within a certain size.

According to the modification, when the clipping position of the combined image is changed based on the position and orientation information at the time of image capturing by the imaging unit 1202 and the position and orientation information at the time of combined image display on the display unit 1206, the combined image is moved so that the moving amount of the clipping position falls within a predetermined range. This makes it possible to reduce a strangeness felt by the HMD user who views the image displayed on the display unit 1206.

A second exemplary embodiment of the present disclosure will be described below. According to the present exemplary embodiment, the moving amount between frames of an image is limited. Elements which have already been described in the first exemplary embodiment are assigned the same reference numeral, and redundant descriptions thereof will be omitted.

FIG. 10 is a block diagram illustrating a functional configuration of the display position change unit 1205 according to the present exemplary embodiment. As compared with the first exemplary embodiment illustrated in FIG. 3, a moving amount holding unit 2001 is added to the display position change unit 1205 according to the present exemplary embodiment. The moving amount holding unit 2001 is a function unit for holding in which direction and how much the combined image has moved (moving amount) in the last frame.

FIGS. 11A to 11C illustrate the combined image movement control by the display position change unit 1205 according to the present exemplary embodiment. Referring to FIGS. 11A to 11C, the drawing on the left illustrates the user wearing the HMD 1201 when viewed from the top, and the drawing on the right illustrates an image displayed on the display unit 1206.

FIG. 11A illustrates the image of the N-th frame displayed on the HMD 1201. FIG. 11B illustrates the image of the (N+1)-th frame displayed on the HMD 1201 in a case where the moving amount control according to the present exemplary embodiment is not performed when the HMD user shakes the head to the left. Referring to FIG. 11B, since the HMD user quickly shakes the head, the image moves by a moving amount 2101 and a black image is displayed for the moving amount.

FIG. 11C illustrates the image of the (N+1)-th frame displayed on the HMD 1201 in a case where the moving amount control according to the present exemplary embodiment is performed. The moving amount control according to the present exemplary embodiment controls the moving amount such that the difference in moving amount between the last frame (N-th frame) and the current frame ((N+1)-th frame) falls within a predetermined range. More specifically, the moving amount calculation unit 1303 determines whether the difference in moving amount between the last frame and the current frame is equal to or less than an upper limit, and, when the difference exceeds the upper limit, changes the moving amount such that difference equals the upper limit.

Figure 12:
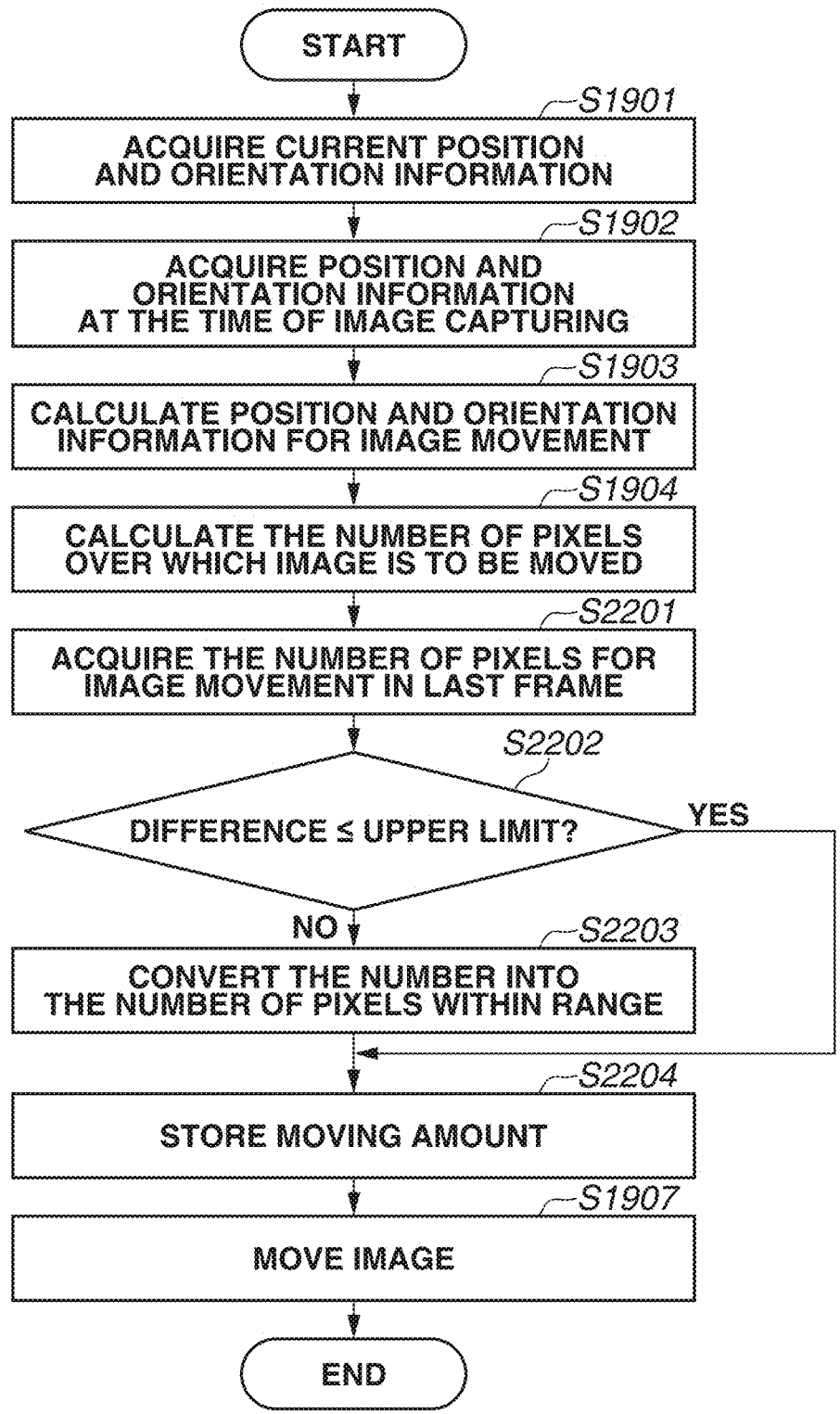
FIG. 12 is a flowchart illustrating the combined image movement control according to an exemplary embodiment of the subject disclosure.

FIG. 12 is a flowchart illustrating image processing when the combined image movement control according to the present exemplary embodiment is performed. As compared with the flowchart according to the first exemplary embodiment illustrated in FIG. 9, steps S2201 to S2204 are added or changed. Differences from the flowchart illustrated in FIG. 9 will be described below.

In step S2201, the moving amount calculation unit 1303 acquires the moving amount in the last frame from the moving amount holding unit 2001. In step S2202, the moving amount calculation unit 1303 calculates the difference between the moving amount acquired in step S2201 and the moving amount calculated in step S1904 to determine whether the calculated difference is equal to or less than an upper limit. When the calculated difference exceeds the upper limit (NO in step S2202), the processing proceeds to step S2203. In step S2203, the moving amount calculation unit 1303 changes the moving amount to the set upper limit. In step S2204, the moving amount calculation unit 1303 stores the calculated moving amount in a movement amount holding unit 1901.

According to the present exemplary embodiment, if the moving amount between frames is limited, the movement of the display position of the combined image is limited also when the HMD user moves the head in a quick motion. This makes it possible to reduce a strangeness of the HMD display image of which the display position is quickly changed.

A third exemplary embodiment of the present disclosure will be described below. In the above descriptions, the first exemplary embodiment is configured to limit the moving amount in each frame, and the second exemplary embodiment is configured to limit the difference in moving amount between two frames. The present exemplary embodiment is configured to limit the moving amount in each frame and limit the difference in moving amount between two frames. Elements which have already been described in the first and the second exemplary embodiments are assigned the same reference numeral, and redundant descriptions thereof will be omitted.

Figure 13:
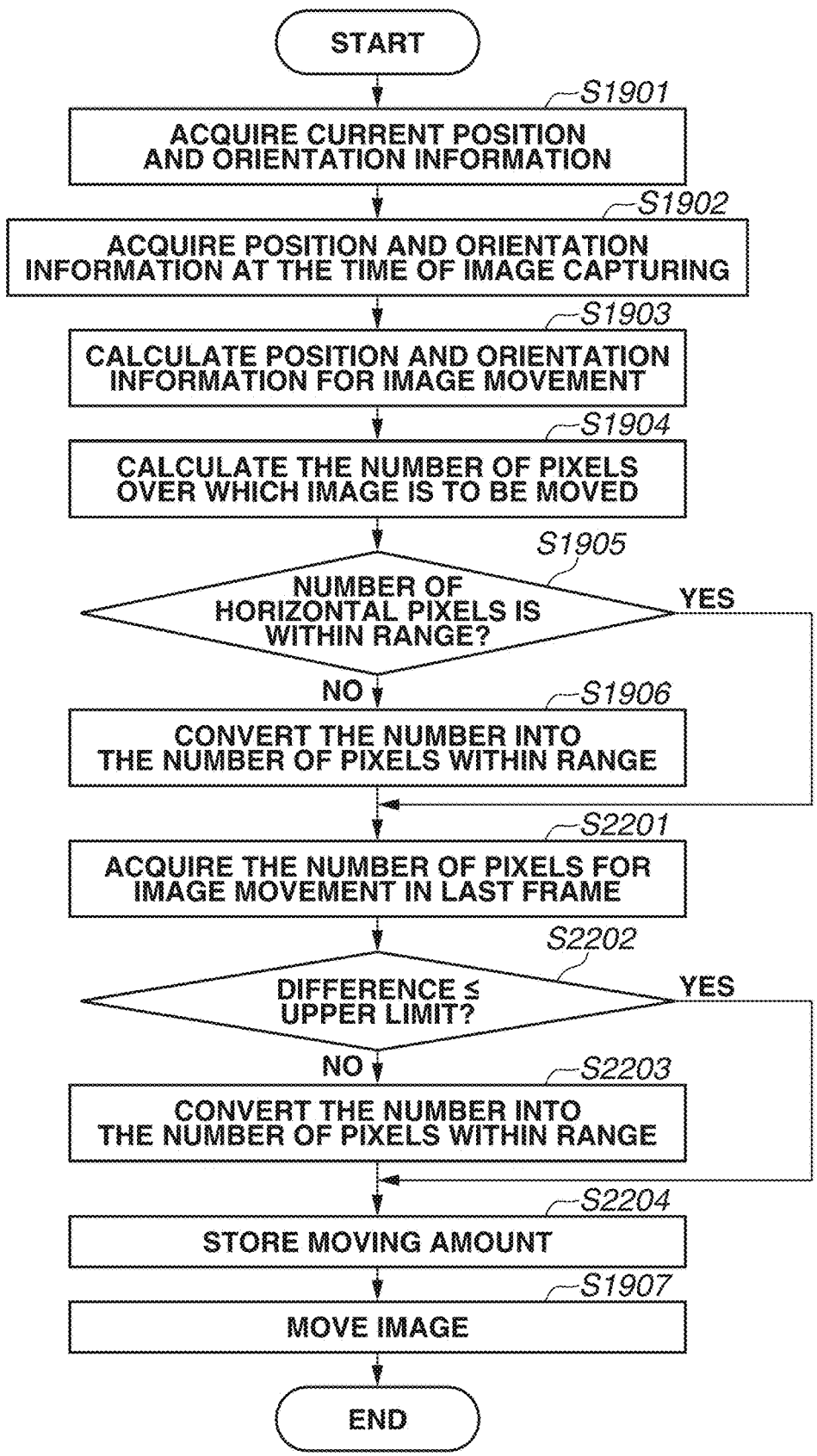
FIG. 13 is a flowchart illustrating combined image movement control according to an exemplary embodiment of the subject disclosure.

FIG. 13 is a flowchart illustrating image processing when combined image movement control according to the present exemplary embodiment is performed. Referring to FIG. 13, processing in steps S1901 to S1906 is similar to the processing according to the first exemplary embodiment. After step S1906, processing in steps S2201 to S2204 is performed. Processing in steps S2201 to S2204 is similar to the processing according to the second exemplary embodiment. In step S1907, based on the moving amount calculated in the series of processing, the movement unit 1304 moves, relatively to the display unit 1206, the combined image received from the image processing apparatus 1210 and displays the image on the display unit 1206.

According to the present exemplary embodiment, the moving amount of the combined image is limited for each frame and the moving amount between frames is limited, making it possible to further reduce a strangeness felt by the HMD user.

A fourth exemplary embodiment of the present disclosure will be described below. According to the present exemplary embodiment, the moving amount calculation unit 1303 calculates the moving amount taking into consideration not only variation of the position and orientation of the HMD 1201 but also a delay time since the imaging unit 1202 has captured an image until a combined image is displayed on the display unit 1206. More specifically, when the delay time since the imaging unit 1202 has captured an image until a combined image is displayed on the display unit 1206 is equal to or larger than a threshold value, the moving amount calculation unit 1303 calculates the moving amount based on the position and orientation information of the HMD 1201 before a predetermined time period, and, when the delay time is less than the threshold value, calculates the moving amount based on the position and orientation information at the time of image capturing. Elements which have already been described in the first to the third exemplary embodiments are assigned the same reference numeral, and redundant descriptions thereof will be omitted.

FIGS. 14A and 14B are block diagrams illustrating functional configurations of the display position change unit 1205 according to the present exemplary embodiment. Comparing the configuration of the present exemplary embodiment illustrated in FIG. 14A with the configuration of the second exemplary embodiment illustrated in FIG. 10, a position and orientation information holding unit 2401 is added to the display position change unit 1205 according to the present exemplary embodiment. The position and orientation information holding unit 2401 is a function unit for holding the past position and orientation information of the HMD 1201. When necessary, the position and orientation information holding unit 2401 holds orientation information transmitted from the position and orientation calculation unit 1208.

As a modification, the position and orientation information holding unit 2401 may be configured to store only the orientation information from the orientation sensor unit 1203, as illustrated in FIG. 14B. In this configuration, when the time period since the imaging unit 1202 has captured an image until a combined image is displayed on the display unit 1206 exceeds the threshold value, the moving amount calculation unit 1303 calculates the moving amount only with the orientation information. Hereinafter, descriptions will be made based on the configuration of the present exemplary embodiment illustrated in FIG. 14A.

According to the present exemplary embodiment, when the delay time since the imaging unit 1202 has captured an image until a combined image is displayed on the display unit 1206 is less than 50 milliseconds (msec), the moving amount calculation unit 1303 calculates the moving amount based on the position and orientation information at the time of image capturing. On the other hand, when the delay time is 50 msec or more, the moving amount calculation unit 1303 calculates the moving amount based on the position and orientation information before 50 msec.

In this configuration, limiting the maximum delay time to 50 msec enables limitation of the moving amount of the HMD 1201, for example, even if the processing load concentrates on the image processing apparatus 1210 to prolong the delay time. For example, if the HMD 1201 largely moves during the delay time which is not restricted, a black area corresponding to the large moving amount will occur. However, according to the present exemplary embodiment, restricting the delay time to restrict the moving amount of the HMD 1201 enables imitation of the size of a black area displayed on the display unit 1206 of the HMD 1201. Such a configuration provides a maximum time period of 50 msec for holding the position and orientation information, providing an effect of preventing an increase in memory capacity. Processing according to the present exemplary embodiment will be described below with reference to FIG. 15.

Figure 15:
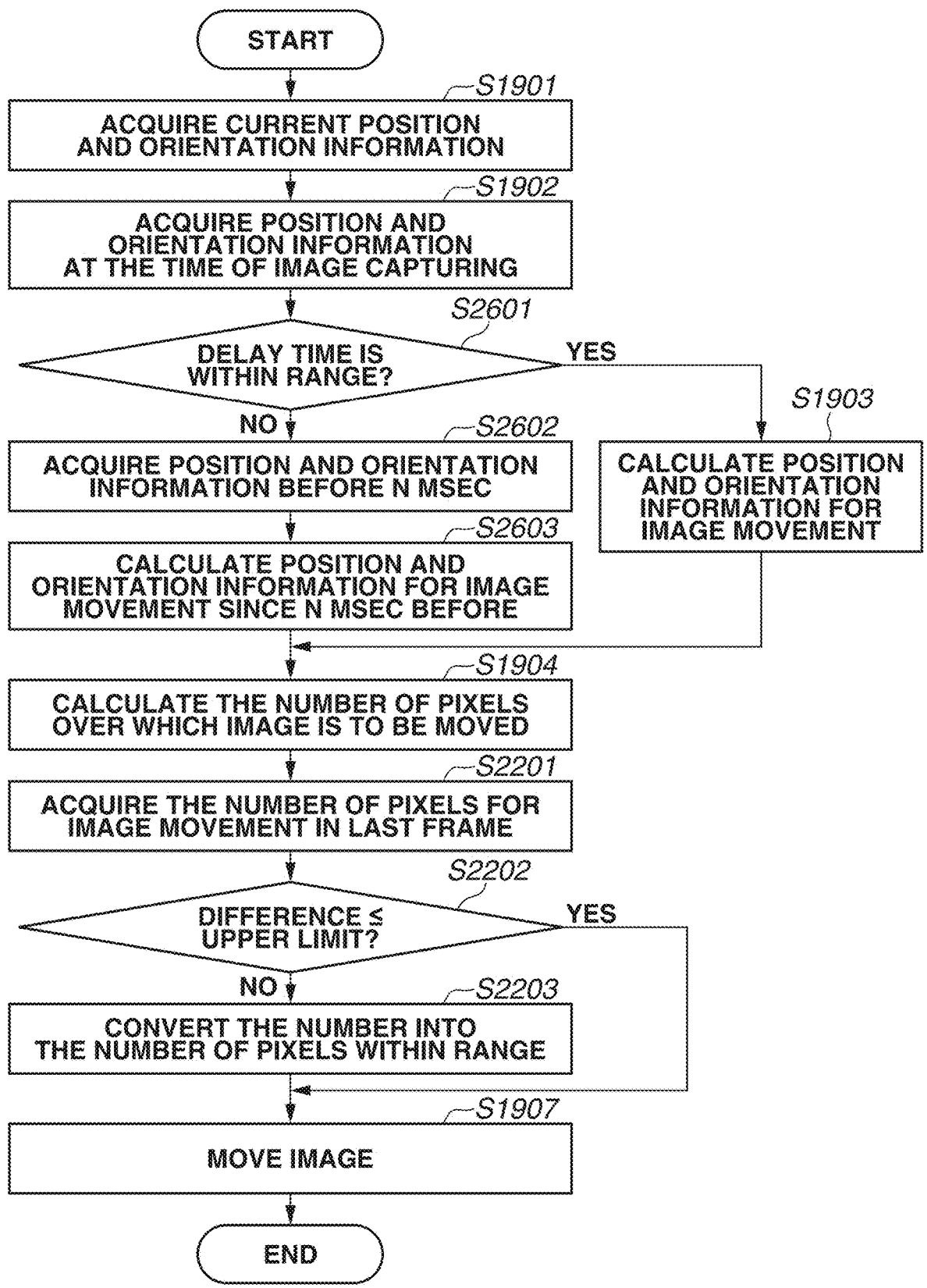
FIG. 15 is a flowchart illustrating combined image movement control according to an exemplary embodiment of the subject disclosure

FIG. 15 is a flowchart illustrating image processing when combined image movement control according to the present exemplary embodiment is performed. Only differences from the flowchart illustrated in FIG. 12 will be described below.

In step S2601, the moving amount calculation unit 1303 calculates a time period (delay time) since (the background image of) the combined image received from the image processing apparatus 1210 has been captured by the imaging unit 1202. A method of calculating a delay time can be implemented by adding time information when associating the captured image with the display image according to the first exemplary embodiment. Then, the moving amount calculation unit 1303 determines whether the calculated delay time is less than a threshold value. When the delay time is equal to or larger than the threshold value (NO in step S2601), the processing proceeds to step S2602. In step S2602, the moving amount calculation unit 1303 acquires the position and orientation information before N msec from the position and orientation information holding unit 2401. Although, in the present exemplary embodiment, N msec is 50 msec, N msec is not limited thereto, and may be a predetermined value or a value specified via the operation unit 1223 by the user.

In step S2603, the moving amount calculation unit 1303 calculates variation of the position and orientation information based on the position and orientation information before N msec acquired in step S2602 and the current position and orientation information acquired in step S1801. Processing in step S1804 and subsequent steps is similar to the processing illustrated in FIG. 12, and redundant descriptions thereof will be omitted.

According to the present exemplary embodiment, calculating the moving amount taking the delay time into consideration enables reduction of a strangeness felt by the HMD user who views the image displayed on the display unit 1206.

A fifth exemplary embodiment of the present disclosure will be described below. The present exemplary embodiment will be described below centering on a system configuration suitable for moving the display position of the generated combined image relative to the display unit based on the position and orientation information at the time of image capturing by the imaging unit 1202 and the position and orientation information at the time of combined image display on the display unit 1206.

Figure 16:
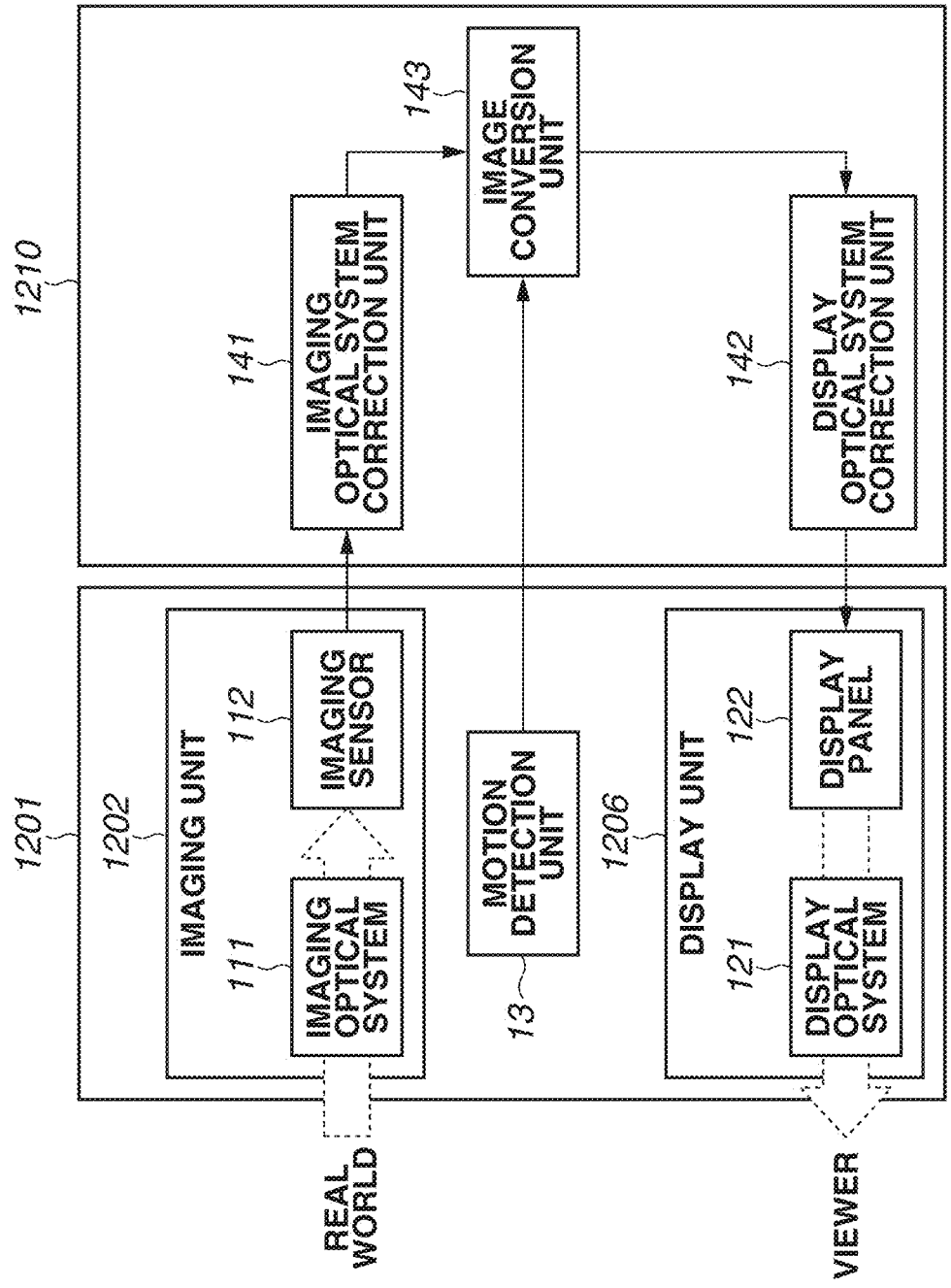
FIG. 16 is a block diagram illustrating a configuration of an image processing system according to an exemplary embodiment of the subject disclosure.

FIG. 16 schematically illustrates an image processing system according to the present exemplary embodiment. FIG. 16 illustrates only function units characterizing the present exemplary embodiment out of the function units of the image processing system illustrated in FIG. 2. The HMD 1201 includes the imaging unit 1202, the display unit 1206, and a motion detection unit 13. The imaging unit 1202 includes an imaging optical system 111 and an imaging sensor 112 and generates a captured video image of the real world. The imaging optical system 111 mounted on the imaging unit 1202 includes an imaging lens. The imaging sensor 112 is, for example, a Complementary Metal Oxide Semiconductor (CMOS) sensor for photoelectrically converting a subject image formed by the imaging optical system 111. The imaging unit 1202 focuses light of the real world onto the image sensor via an imaging lens in this way to convert the light into an electrical signal, thus acquiring a captured video image.

The display unit 1206 includes a display optical system 121 and a display panel 122. The user views a display video image displayed on the display panel 122 via the display optical system 121. The display optical system 121 mounted on the display unit 1206 includes a lens and a prism type optical element having a plurality of reflection surfaces. The display optical system 121 optically enlarges the video image on the display panel 122 to present to the user a display video image most suitable for the HMD 1201.

The motion detection unit 13 detects a motion of the HMD 1201 by detecting the position and orientation (position, direction, and orientation) of the head of the user wearing the HMD 1201. The motion detection unit 13 includes an acceleration sensor and an angular velocity sensor.

Figure 17:
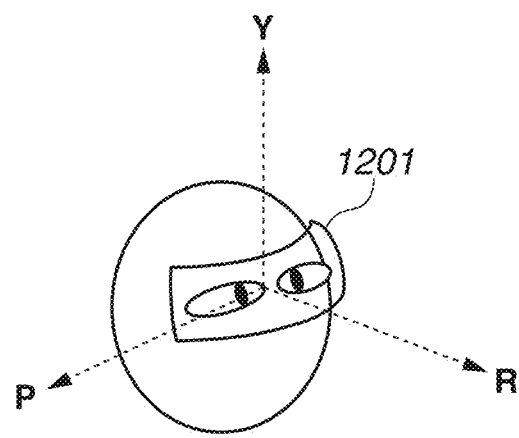
FIG. 17 illustrates motions of the user's head according to an exemplary embodiment of the subject disclosure.

FIG. 17 schematically illustrates motions of the user's head. According to the present exemplary embodiment, the line-of-sight direction of the user wearing the HMD 1201 is defined as a Roll axis (R), a direction horizontal to the line-of-sight direction is defined as a Pitch axis (P), and a direction perpendicular to the line-of-sight direction is defined as a Yaw axis (Y). Respective rotations around the Roll, the Pitch, and the Yaw axes are defined as Roll, Pitch, and Yaw. More specifically, Roll occurs when the user inclines the head, Pitch occurs when the user bows the head, and Yaw occurs when the user shakes the head in the lateral direction. The motion detection unit 13 outputs data of the acceleration and the rotational angular velocity in the Roll, Pitch, and Yaw axes directions.

The image processing apparatus 1210 includes an imaging optical system correction unit 141 for correcting an image of the imaging optical system 111 and a display optical system correction unit 142 for correcting an image of the display optical system 121. The image processing apparatus 1210 also includes an image conversion unit 143 for performing image conversion on the video image having undergone imaging optical correction so as not to be affected by a video image delay arising in response to the motion of the HMD 1201 detected by the motion detection unit 13. The image conversion unit 143 functions as a unit for generating a display target image on the display unit 1206 through the above-described image conversion. Although, in the present exemplary embodiment, the image captured by the imaging unit 1202 is displayed as a display image as it is, the user may be allowed to view, for example, an enlarged version of the captured image as a display image.

The HMD 1201 may be provided with a part or all of the functions of the image processing apparatus 1210.

Generally, an image obtained via an optical system provides different imaging magnifications between the vicinity of the optical axis center and the vicinity of the circumference of the optical system and different imaging magnifications between wavelengths of light. Therefore, the image quality is adversely affected by the distortion aberration, chromatic aberration of magnification, and peripheral brightness reduction. The imaging optical system correction unit 141 and the display optical system correction unit 142 have a function of performing image correction for correcting the influence on the image quality occurring via the optical system. The image correction includes the shading correction and distortion aberration correction. The imaging optical system correction unit 141 corrects the optical characteristics having occurred in the imaging optical system 111. The display optical system correction unit 142 corrects the optical characteristics that occur in the display optical system 121, in advance.

Although it is assumed that the HMD 1201 in FIG. 16 includes one imaging unit 1202 and one display unit 1206, the present exemplary embodiment is not limited thereto. The HMD 1201 may include a plurality of the imaging units 1202 and/or a plurality of the display units 1206. For example, generally, a head mounted image display apparatus like the HMD 1201 includes two imaging units 1202 and two display units 1206 for both eyes.

Figure 18:
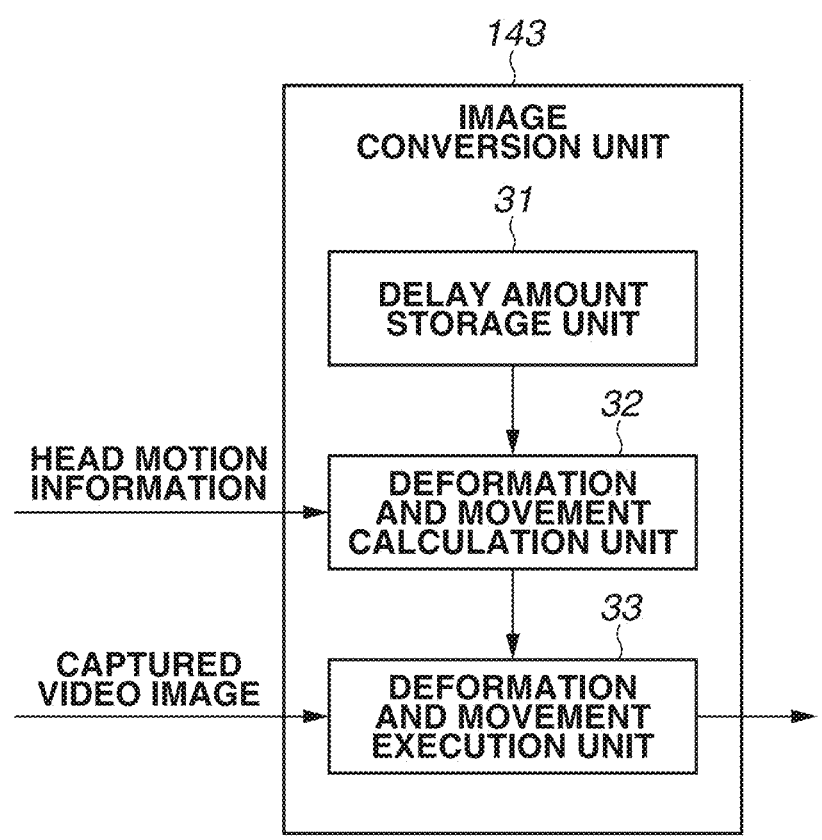
FIG. 18 is a block diagram illustrating a configuration of an image conversion unit according to an exemplary embodiment of the subject disclosure.

The image conversion unit 143 will be described in details below. FIG. 18 illustrates a functional configuration of the image conversion unit 143 according to the present exemplary embodiment. A delay amount storage unit 31 stores the delay amount occurring between the time of the captured video image and the time of the displayed video image. The delay amount may be a fixed value, or a systematically varying delay amount may be acquired from the outside and stored.

Figure 19:
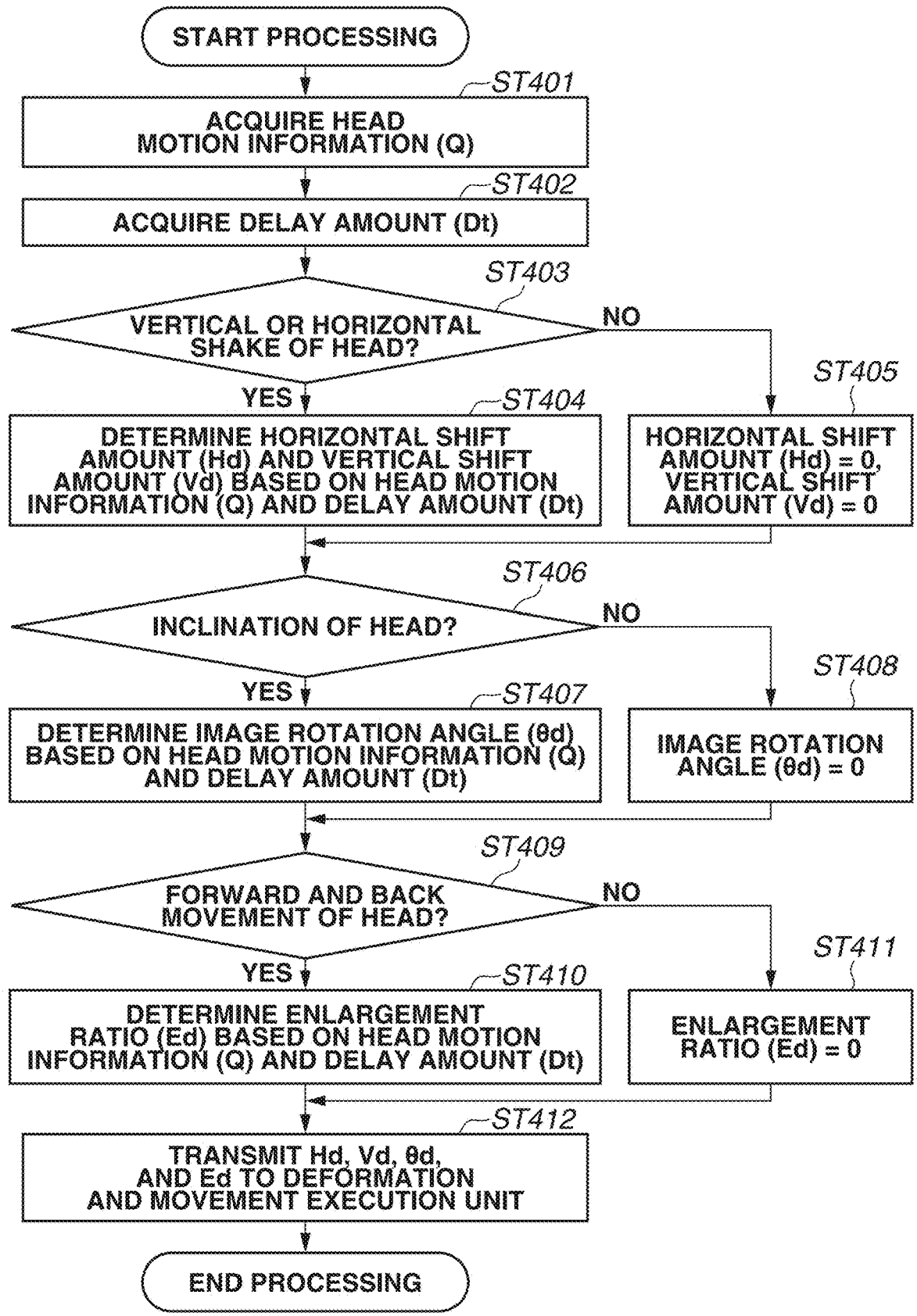
FIG. 19 is a flowchart illustrating processing of a deformation and movement calculation unit according to an exemplary embodiment of the subject disclosure.

A deformation and movement calculation unit 32 is a function unit for calculating the moving amount and the deformation amount of a captured video image based on head motion information input from the motion detection unit 13 and the delay amount stored in the delay amount storage unit 31. Operations of the deformation and movement calculation unit 32 will be described in detail below with reference to the flowchart illustrated in FIG. 19.

In step ST401, the deformation and movement calculation unit 32 acquires head motion information Q from the motion detection unit 13. As above-described, the head motion information Q is sensor data measured through a sensor such as an acceleration sensor or an angular velocity sensor, and numerical data of the motion (shake and movement) of the head. In step ST402, the deformation and movement calculation unit 32 acquires a delay amount Dt from the delay amount storage unit 31.

In step ST403, the deformation and movement calculation unit 32 determines a vertical or horizontal shake of the head based on the head motion information Q. As an example method of determining a vertical or horizontal shake of the head, there is a method of performing the determination based on the Yaw angular velocity and the Pitch angular velocity. According to the present exemplary embodiment, when a Yaw angular velocity $Y\omega$ is equal to or larger than a predetermined value, the deformation and movement calculation unit 32 determines a horizontal shake of the head. When a Pitch angular velocity $P\omega$ is equal to or larger than a predetermined value, the deformation and movement calculation unit 32 determines a vertical shake of the head.

When the deformation and movement calculation unit 32 determines a vertical or horizontal shake of the head (YES in step ST403), the processing proceeds to step ST404. In step ST404, the deformation and movement calculation unit 32 calculates a horizontal shift amount (Hd) and a vertical shift amount (Vd) of the image. On the other hand, when the deformation and movement calculation unit 32 determines neither a vertical nor horizontal shake of the head (NO in step ST 403), the processing proceeds to step ST405. In step ST405, the deformation and movement calculation unit 32 sets the horizontal shift amount (Hd) and the vertical shift amount (Vd) of the image to 0.

In step ST406, the deformation and movement calculation unit 32 determines an inclination of the head based on the head motion information Q. Methods of determining an inclination of the head include a method of determination based on a Roll angular velocity. According to the present exemplary embodiment, when a Roll angular velocity $R\omega$ is equal to or larger than a predetermined value, the deformation and movement calculation unit 32 determines that the head is inclined. When the deformation and movement calculation unit 32 determines an inclination of the head (YES in step ST406), the processing proceeds to step ST407. In step ST407, the deformation and movement calculation unit 32 calculates the rotation angle ($\theta$d) of the image. On the other hand, when the deformation and movement calculation unit 32 determines no inclination of the head (NO in step ST406), the processing proceeds to step ST408. In step ST408, the deformation and movement calculation unit 32 sets the rotation angle ($\theta$d) of the image to 0.

In step ST409, the deformation and movement calculation unit 32 determines a forward and back movement of the head based on the head motion information Q. Methods of determining a forward and back movement of the head include a method of determination based on information about the acceleration in the Roll axis direction. According to the present exemplary embodiment, when an acceleration Ra in the Roll axis direction is equal to or larger than a predetermined value, the deformation and movement calculation unit 32 determines a forward and back movement of the head. When the deformation and movement calculation unit 32 determines a forward and back movement of the head (YES in step ST409), the processing proceeds to step ST410. In step ST410, the deformation and movement calculation unit 32 calculates the enlargement ratio (Ed) of the image. On the other hand, when the deformation and movement calculation unit 32 determines no forward and back movement of the head (NO in step ST409), the processing proceeds to step ST411. In step ST411, the deformation and movement calculation unit 32 sets the enlargement ratio (Ed) of the image to 0.

In step ST412, the deformation and movement calculation unit 32 transmits the calculated horizontal shift amount Hd, the vertical shift amount Vd, the rotation angle $\theta$d, and the enlargement ratio Ed of the image to a deformation and movement execution unit 33. Thus, the deformation and movement calculation unit 32 calculates the moving amount and the deformation amount of the captured video image based on the head motion information Q input from the motion detection unit 13 and the delay amount stored in the delay amount storage unit 31.

The order of calculation of the moving amount and the deformation amount is not particularly limited. After calculating the magnification by the forward and back movement of the head, the shift amount by a vertical or horizontal shake of the head may be calculated. A unit for calculating the moving amount and the deformation amount may perform image conversion in a range predictable based on the head motion information Q and the delay amount Dt so that the user does not feel a strangeness.

The deformation and movement execution unit 33 is a function unit for performing image conversion on a captured video image input from the imaging optical system correction unit 141 by using image conversion parameters input from the deformation and movement calculation unit 32. The image conversion is at least one of movement and deformation including horizontal and vertical shifts, rotation, enlargement, and reduction of an image. Methods of image conversion include a method of calculation through a (bilinear or bicubic) image conversion algorithm based on a frame buffer or a line buffer, and a method of shifting a video image in a pseudo way by shifting a synchronization signal of the video image. Performing image conversion in this way enables reduction of a strangeness caused by the difference between an experienced video image and the real world produced by a latency.

FIGS. 20A to 20E illustrate effects by the image conversion unit 143 according to the present exemplary embodiment. FIG. 20A illustrates a case where the user wearing the HMD 1201 does not move the head. FIG. 20B illustrates a case where the user moves the head in a Yaw motion. FIG. 20C illustrates a case where the user moves the head in a Pitch motion. FIG. 20D illustrates a case where the user moves the head in a Roll motion. FIG. 20E illustrates a case where the user moves the head back and forth. Referring to each of FIGS. 20A to 20E, the drawing at the top illustrates a video image viewed by the user via the display unit 1206, the second drawing from the top illustrates the user using the HMD 1201 viewed from the top, the third drawing from the top illustrates the user using the HMD 1201 viewed from the side, and the drawing at the bottom illustrates the user using the HMD 1201 viewed from the front.

As illustrated in FIG. 20A, when the user does not move the head, the video image within the range of an imaging angle of view Aθ generated by the imaging optical system 111 is displayed within the range of a resolution H*V. As illustrated in FIG. 20B, when the user moves the head in a Yaw motion, the deformation and movement calculation unit 32 calculates a Yaw angle Yθ based on the Yaw angular velocity Yω included in the head motion information Q and the delay amount Dt, as in the above-described processing in step ST404. Then, the horizontal shift amount Hd of the image is calculated based on a relation between the Yaw angle Yθ and a reference distance L. The deformation and movement execution unit 33 horizontally shifts the image based on the horizontal shift amount Hd to allow an image conforming to the user's line-of-sight direction to be presented to the user. When the user moves the head in a Pitch motion as illustrated in FIG. 20C, the deformation and movement calculation unit 32 calculates the vertical shift amount Vd of the image, similar to a Yaw motion, and the deformation and movement execution unit 33 vertically shifts the image. This makes it possible to present an image conforming to the user's line-of-sight direction to the user.

When the user moves the head in a Roll motion as illustrated in FIG. 20D, the deformation and movement calculation unit 32 calculates a Roll angle Rθ based on the Roll angular velocity Rω included in the head motion information Q and the delay amount Dt, as in the above-described processing in step ST407. Then, the rotation angle θd of the image is obtained from the Roll angle Rθ. The deformation and movement execution unit 33 rotates the image based on the rotation angle θd to allow an image conforming to the user's line of sight to be presented to the user.

When the user moves the head back and forth as illustrated in FIG. 20E, the deformation and movement calculation unit 32 calculates an moving amount RM in the Roll axis direction based on the acceleration Ra in the Roll axis direction included in the head motion information Q and the delay amount Dt, as in the above-described processing in step ST410. The enlargement ratio Ed of the image is obtained based on the relation between the moving amount RM in the Roll axis direction and the imaging angle of view Aθ. The deformation and movement execution unit 33 enlarges and reduces the image based on the enlargement ratio Ed to present an image conforming to the back and forth motion of the user. As described above, when the image conversion unit 143 performs correction on the display video image based the operation of the motion detection unit 13, a strangeness due to a video image delay can be reduced.

The following describes effects of performing processing of the image conversion unit 143 after the imaging optical system correction unit 141 and before the display optical system correction unit 142, in which the image processing system according to the present exemplary embodiment is characterized. For example, assume a case where the image conversion unit 143 performs processing before the imaging optical system correction unit 141. The image output from the image conversion unit 143 has undergone the image conversion according to information about the motion detection unit 13. More specifically, the imaging optical characteristics generated by the imaging optical system 111 are also changed to movement and deformation conditions through the image conversion. Normally, the imaging optical system correction unit 141 performs correction based on prestored information about the imaging optical characteristics. More specifically, if the imaging optical system correction unit 141 performs processing on the image output from the image conversion unit 143, the imaging optical correction is not performed in an intended way, possibly degrading the image quality depending on the case.

This also applies to a case where the image conversion unit 143 performs processing after the display optical system correction unit 142. The display optical system correction unit 142 corrects in advance the display optical characteristics occurring when the image is viewed via the display optical system 121. If the image conversion unit 143 performs processing on the image having undergone the display optical system correction, the display optical characteristics with image correction undergone in advance are also changed to movement and deformation conditions. Therefore, the display optical correction is not performed in an intended way, possibly degrading the image quality.

According to the present exemplary embodiment, on the other hand, the image processing system including an image display apparatus (HMD) having an imaging optical system and a display optical system performs processing of the image conversion unit 143 after the imaging optical system correction unit 141 and before the display optical system correction unit 142. Therefore, the image corrections of these optical systems are appropriately performed, making it possible to prevent a display video image deviation due to a captured video image delay without producing a strangeness in each optical correction.

[First Modification]

In an image processing system according to a first modification, processing with an inconstant delay is performed on a captured video image of the real world.

Figure 21:
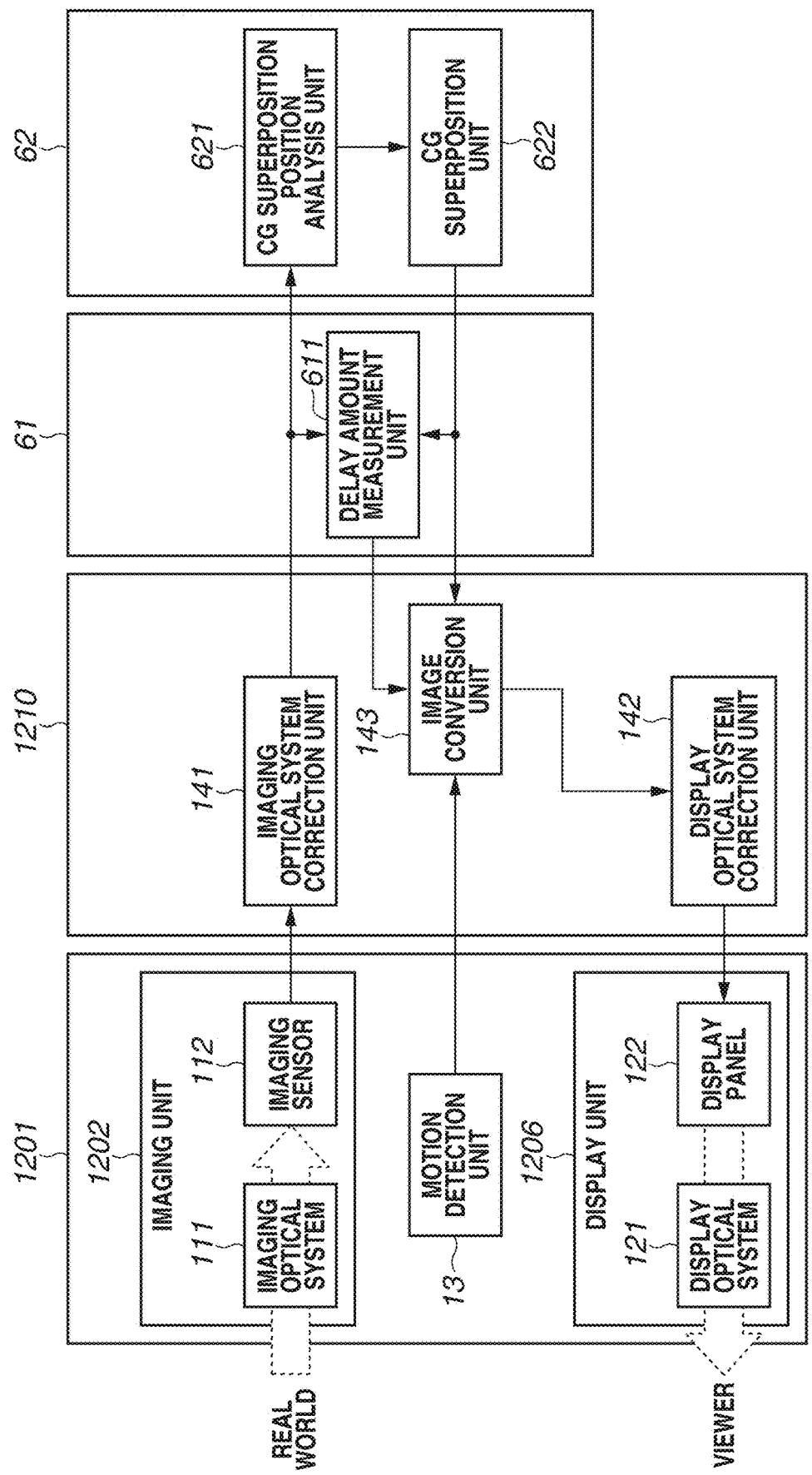
FIG. 21 is a block diagram illustrating a configuration of an image processing system according to an exemplary embodiment of the subject disclosure.

FIG. 21 is a block diagram illustrating a configuration of the image processing system according to the present modification. The image processing system according to the present modification differs from the image processing system according to the fifth exemplary embodiment in that a delay amount measurement apparatus 61 for measuring the of a video image delay and a CG superposition apparatus 62 are provided and that the image conversion unit 143 performs image correction by using delay amount information measured by the delay amount measurement apparatus 61 and a display video image from the CG superposition apparatus 62. The delay amount measurement apparatus 61 and the CG superposition apparatus 62 may be integrally configured with the image processing apparatus 1210 or configured as separate apparatuses as illustrated in FIG. 21.

The delay amount measurement apparatus 61 includes a delay amount measurement unit 611 as a function unit for measuring a time difference between a captured video image input from the imaging optical system correction unit 141 and a display video image input from a CG superposition unit 622 (described below). Methods of measuring the time difference include a method of preparing an internal counter and measuring a difference in input timing between the vertical synchronization signal of the captured video image and the vertical synchronization signal of the display video image. There is another method of measuring the time difference until time stamp information of the captured video image coincides with time stamp information of the display video image. In this case, the time stamp information is embedded as metadata in the captured video image. The measurement method is not limited to a specific method as long as a video image delay time can be measured. In this way, the delay amount measurement apparatus 61 can notify the image conversion unit 143 of an exact delay amount Dt even in a case where the delay time varies according to video image transmission and processing load conditions.

A configuration of the CG superposition apparatus 62 will be described below. The CG superposition apparatus 62 includes a CG superposition position analysis unit 621 and the CG superposition unit 622. The CG superposition position analysis unit 621 performs image analysis in the input captured video image to calculate the CG image drawing position, and outputs CG superposition position information to the CG superposition unit 622. Methods of identifying the CG image drawing position include, for example, a method of arranging a physical index (hereinafter referred to as an MR marker) such as a two-dimensional code in the real space and detecting the MR marker through image analysis on the captured video image. In addition to the above-described method based on image analysis on the captured video image, there is a method of identifying the position of the HMD 1201 and calculating the drawing position of a CG image according to the position of the HMD 1201 by using an optical sensor disposed in the space where the HMD 1201 is used. By using the above-described methods, the CG superposition position analysis unit 621 calculates CG drawing position information indicating the position where a CG image is to be drawn relatively to the captured video image of the real space. The CG drawing position is calculated by using the CPU. When the image analysis is performed by arranging a number of MR markers in the real space, the processing time may be inconstant because calculation for MR marker detection occurs a plurality of times. In such a case, the amount of video image delay with respect to the input video image may dynamically vary.

The CG superposition unit 622 generates a display video image composed of a captured video image with a virtual image (CG data) superimposed thereon by using the CG superposition position information calculated by the CG superposition position analysis unit 621. The CG data refers to three-dimensional (3D) CAD data generated by using CAD software and 3D CG data generated by using graphic design software. Based on the CG superposition position information, the CG superposition unit 622 performs rendering on prepared CG data and superimposes the CG data on the captured video image. This makes it possible to generate a video image (combined image) in which CG data that does not exist in the real space is drawn. Although, in this case, the calculation is performed by using a graphic processing unit (GPU) for CG data rendering, the load on rendering may increase resulting in an inconstant processing time depending on the contents of the CG data. Even in this case, the amount of video image delay with respect to the input video image may dynamically vary.

More specifically, the CG superposition apparatus 62 often provides an inconstant time difference between the time when a video image is input and the time when the video image is output. Even in such a case, the delay amount measurement apparatus 61 can measure in real time the amount of video image delay occurring in the CG superposition apparatus 62.

The image conversion unit 143 presumes and determines a latency according to the delay amount Dt and performs deformation and movement of the video image. Although, in the present modification, the amount of video image delay Dt dynamically varies, inputting the delay amount Dt from the delay amount measurement unit 611 enables prevention of a display video image deviation due to a captured video image delay even in a case where the delay changes in real time. This makes it possible to reduce a strangeness due to a video image delay.

According to the present modification, when the image processing system performs processing with an inconstant delay on a captured video image, measuring the delay amount and correcting the video image according to the delay amount enables prevention of a display video image deviation due to the captured video image delay.

[Second Modification]

Figure 22:
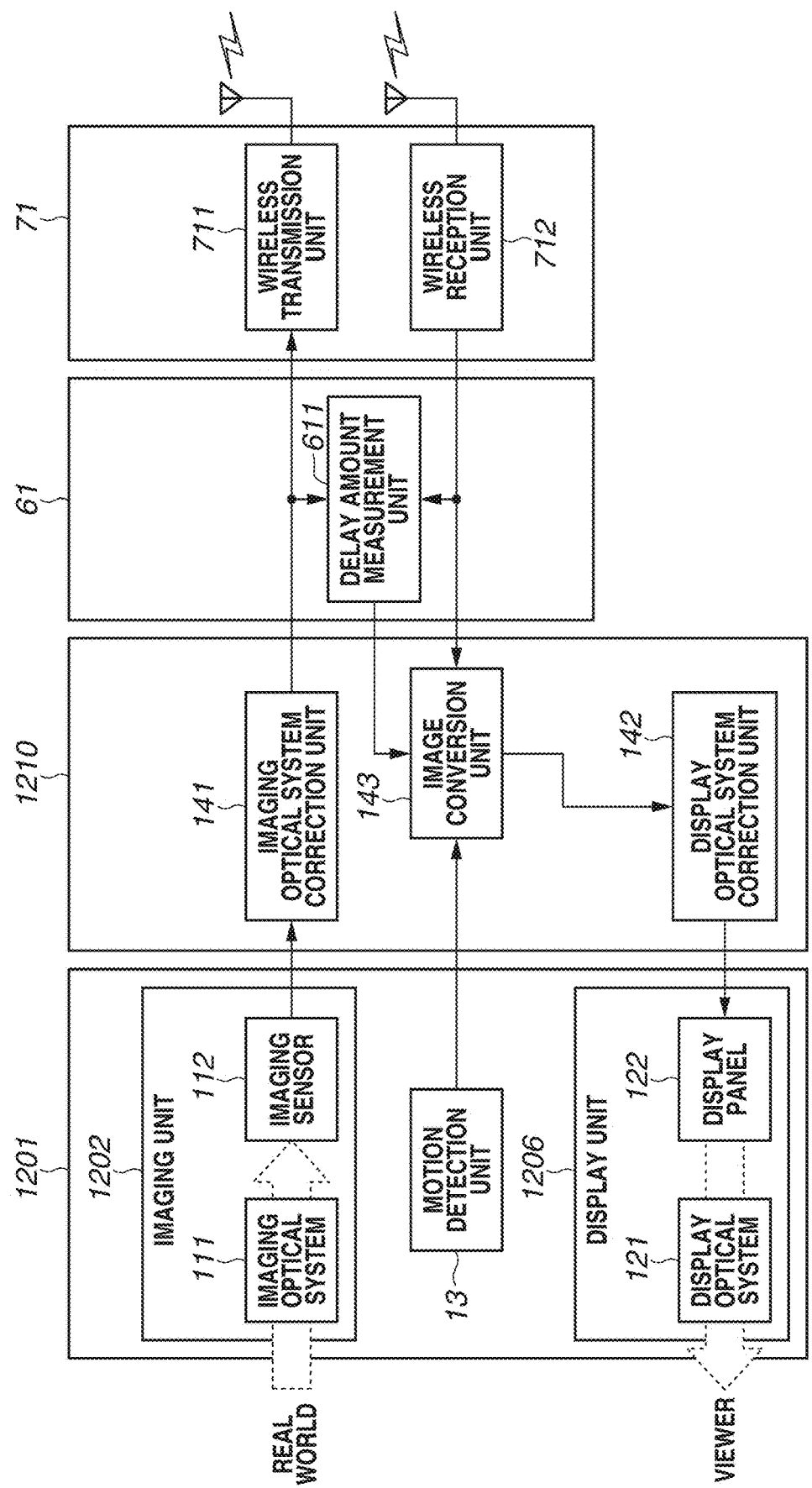
FIG. 22 is a block diagram illustrating a configuration of an image processing system according to an exemplary embodiment of the subject disclosure.

A second modification will be described below with reference to FIG. 22. FIG. 22 is a block diagram illustrating a configuration of an image processing system according to the present modification. The image processing system illustrated in FIG. 22 includes a wireless transmission apparatus 71 instead of the CG superposition apparatus 62 illustrated in FIG. 21. The wireless transmission apparatus 71 includes a wireless transmission unit 711 for wirelessly transmitting a video image to an external apparatus (not illustrated), and a wireless reception unit 712 for wirelessly receives a video image processed by an external apparatus (not illustrated).

In both the wireless transmission unit 711 and the wireless reception unit 712, there may be cases where, depending on radio wave conditions, the communication throughput is degraded making it difficult to perform video image transmission. If the communication throughput is degraded, a video image delay or a video frame dropout may occur, possibly resulting in a dynamically varying the amount of video image delay.

Even in a case where the delay amount varies in real time in a system utilizing wireless transmission of the wireless transmission apparatus 71, it is possible to prevent a display video image deviation due to a captured video image delay.

Although, in the present modification, the delay amount dynamically varies in the processing of the CG superposition apparatus 62 and the wireless transmission apparatus 71, the processing of the CG superposition apparatus 62 and the wireless transmission apparatus 71 does not necessarily involve an inconstant delay. Therefore, only the CG superposition apparatus 62 and the wireless transmission apparatus 71 may be added without adding the delay amount measurement apparatus 61. Such a configuration is also included in the category of the present disclosure.

[Third Modification]

An image processing system according to a third modification generates CG data as processing with an inconstant delay on a captured video image of the real world. In the system, the image conversion unit 143 converts only the generated CG data.

Figure 23:
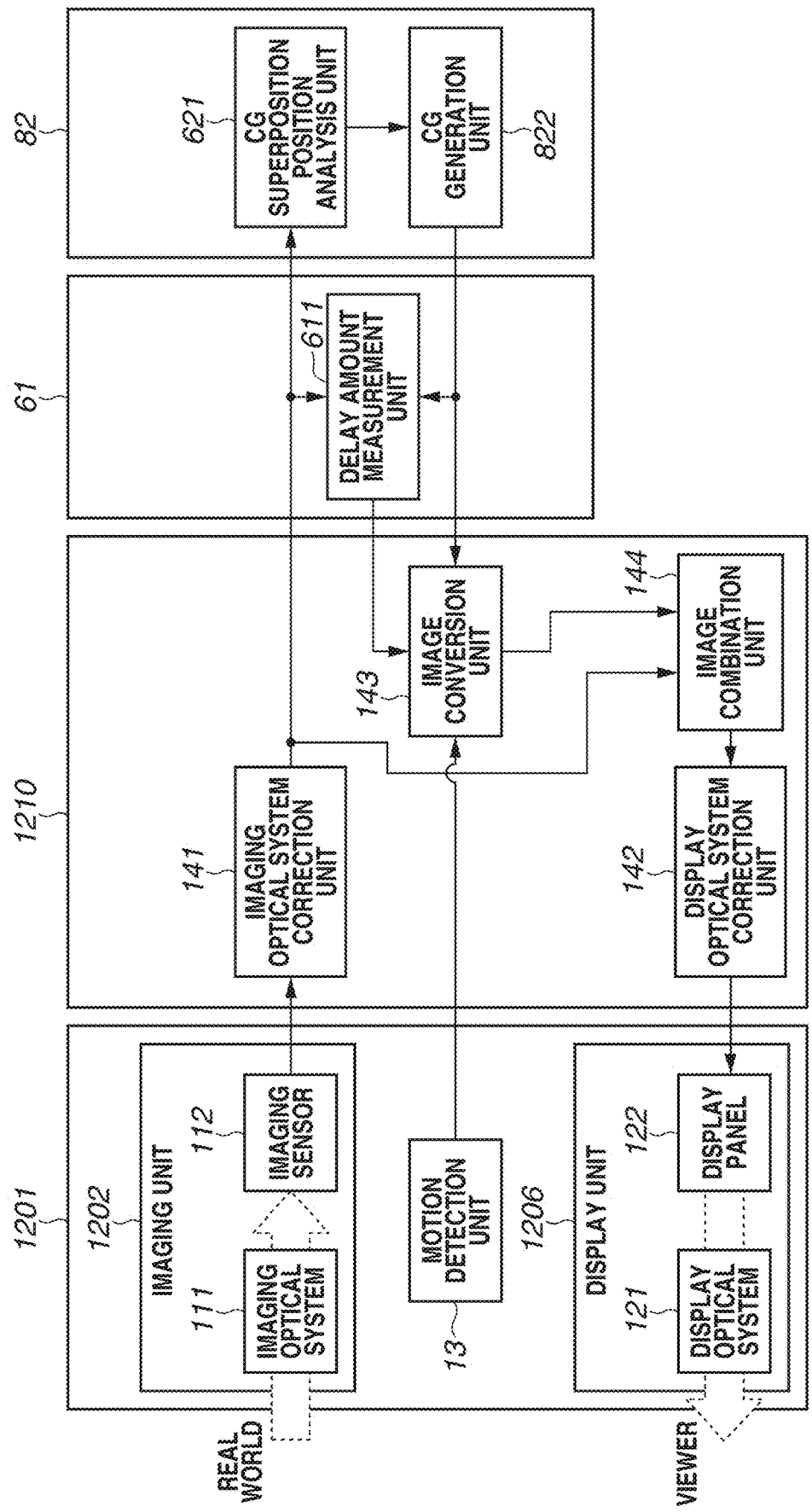
FIG. 23 is a block diagram illustrating a configuration of an image processing system according to an exemplary embodiment of the subject disclosure.

FIG. 23 is a block diagram illustrating a configuration of the image processing system according to the present modification. The image processing system according to the present modification differs from the image processing system according to the second modification in that CG data is not superimposed on a captured video image and that a CG generation apparatus 82 only generates and transfers the CG data, and an image combination unit 144 combines the CG data with the captured video image. As an advantage of this configuration, a video image can be displayed to the user with a minimum delay since the captured video image is not affected by delay amount variations. However, on the other hand, in a case where the image combination unit 144 combines a CG video image, the CG video image will include a delay amount relative to a captured video image because of the influence of the CG generation apparatus 82. Therefore, according to the present modification, only CG data is processed by the image conversion unit 143 to prevent a strangeness in the display video image after the CG combination.

Figure 24A:
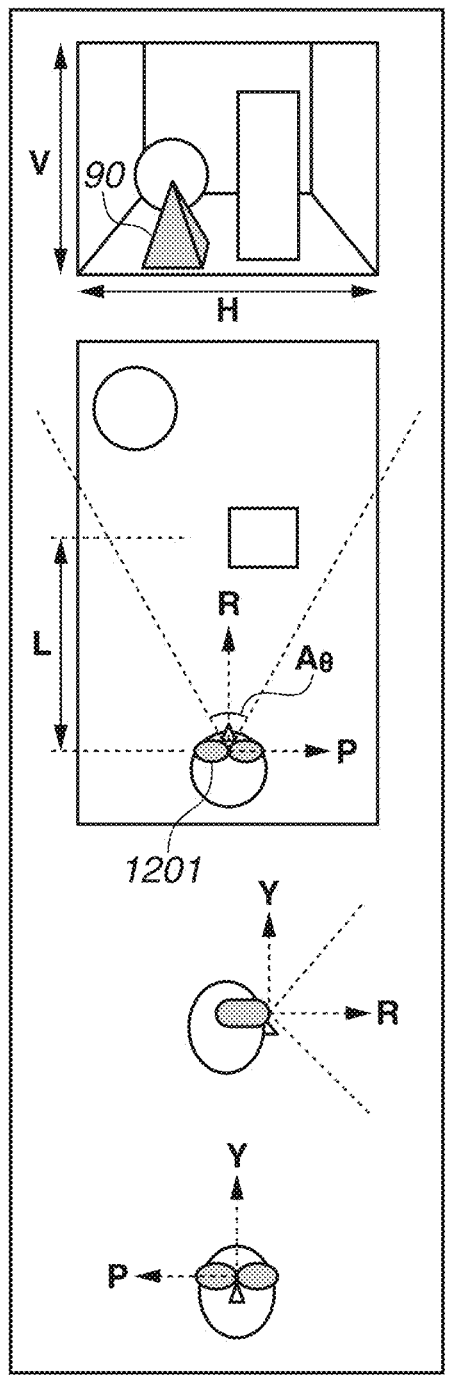
FIGS. 24A and 24B illustrate effects of an image conversion unit according to an exemplary embodiment of the subject disclosure.
Figure 24B:
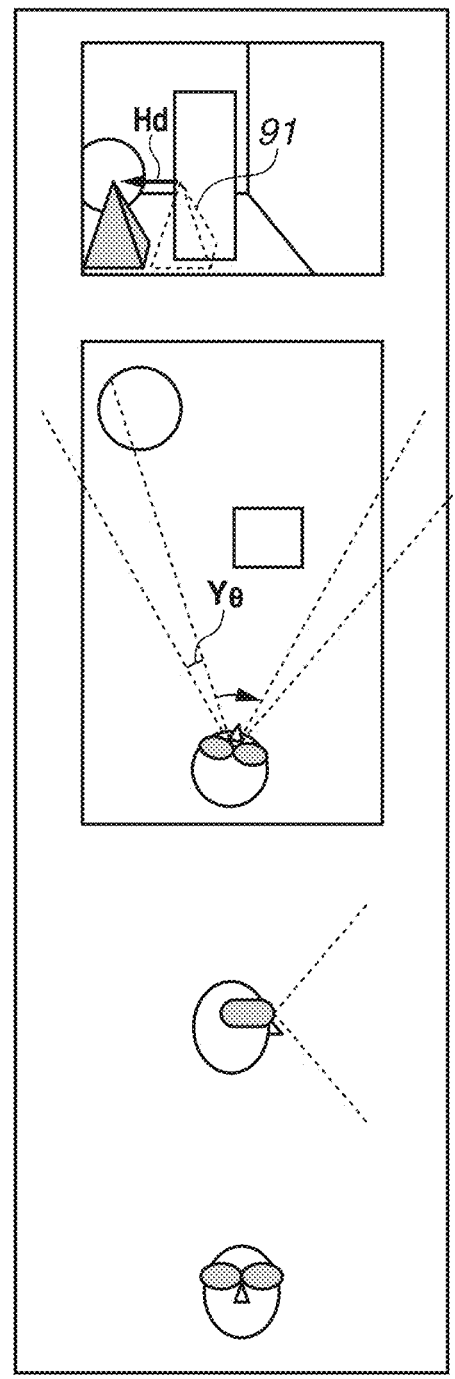

FIGS. 24A and 24B illustrate effects by the image conversion unit 143 according to the present modification. FIG. 24A illustrates a case where the user wearing the HMD 1201 does not move the head, and FIG. 24B illustrates a case where the user moves the head in a Yaw motion. Referring to each of FIGS. 24A and 24B, the drawing at the top illustrates a video image viewed by the user via the display unit 1206, the second drawing from the top illustrates the user using the HMD 1201 viewed from the top, the third drawing from the top illustrates the user using the HMD 1201 viewed from the side, and the drawing at the bottom illustrates the user using the HMD 1201 viewed from the front.

As illustrated in FIG. 24A, when the user does not move the head, the user views a display video image with CG data 90, which does not exist in the real world, superimposed thereon. As illustrated in FIG. 24B, when the user moves the head in a Yaw motion, the captured video image of the real world is displayed with no delay amount, and the CG data to be superimposed will be displayed in a state where CG data includes a delay amount. Therefore, if the CG data is simply superimposed on a captured video image, the CG data will be superimposed at a position 91, causing a strangeness between the real world and the CG data.

According to the present modification, therefore, the deformation and movement calculation unit 32 calculates the Yaw angle $Y\theta$ based on the Yaw angular velocity $Y\omega$ included in the head motion information Q and the delay amount Dt. The deformation and movement calculation unit 32 further calculates the horizontal shift amount Hd of the image based on a relation between the Yaw angle $Y\theta$ and a reference distance L. The deformation and movement execution unit 33 horizontally shifts the CG data based on the horizontal shift amount Hd and then combines the CG data with the captured video image, making it possible to provide a video image without a strangeness.

As described above, according to the third modification in which only the generated CG data is converted by the image conversion unit 143, correcting the video image according to the delay amount enables prevention of a display video image deviation due to a captured video image delay.

[Fourth Modification]

A fourth modification will be described below. An image processing system according to the present modification generates CG data as processing with an inconstant delay on a captured video image. In the system, the image conversion unit 143 converts the generated CG data, and an image conversion unit 145 converts the captured video image output from the imaging optical system correction unit 141.

Figure 25:
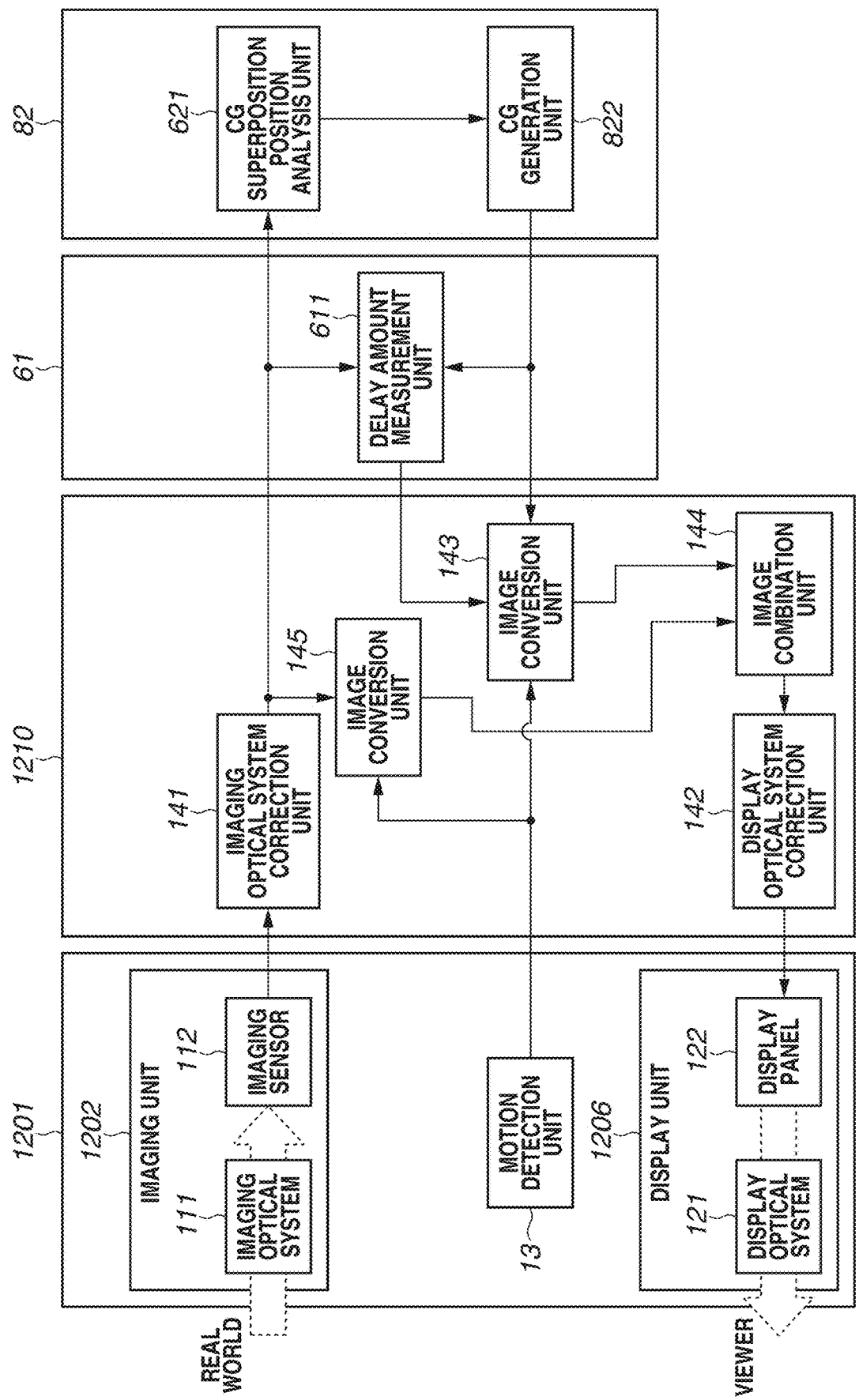
FIG. 25 is a block diagram illustrating a configuration of an image processing system according to an exemplary embodiment of the subject disclosure.

FIG. 25 is a block diagram illustrating a configuration of the image processing system according to the present modification. The image processing system according to the present modification differs from the image processing system according to the third modification in that the image conversion unit 143 or 145 performs image conversion for both the captured video image and the CG data. The image conversion unit 145 has a similar function to the image conversion unit 143, i.e., an image conversion function, as described above. This configuration allows the image conversion unit 145 to correct a delay amount occurring on a hardware basis between video image information input from the imaging unit 1202 and the display video image viewed on the display unit 1206. Therefore, the present modification makes it possible to view a video image of the real world with CG data superimposed thereon with a minimum delay amount.

Other Exemplary Embodiments

A program for implementing the function of each unit included in the image processing apparatus 1210 may be recorded on a computer-readable recording medium, and a computer system may read and execute the program recorded on the recording medium to perform the above-described processing of each unit. The "computer system" includes an operating system (OS) and hardware elements such as peripheral devices.

Each unit included in each apparatus may be implemented by dedicated hardware. Alternatively, each unit included in each apparatus may be configured by a memory and a CPU, and the function of each unit may be implemented when the CPU loads a program for implementing the function of each unit into the memory and then executes the program.

According to the above-described configuration, the present disclosure makes it possible to reduce a strangeness felt by a user of an image display apparatus including an imaging unit.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2017-013239, filed Jan. 27, 2017, and No. 2017-037737, filed Feb. 28, 2017, which are hereby incorporated by reference herein in their entirety.

What is claimed is:

1. An image display apparatus comprising:
an imaging unit configured to capture an image of a real space;
a transmission unit configured to transmit the captured image to an image processing apparatus;
a reception unit configured to receive from the image processing apparatus a combined image generated based on the captured image and a virtual image by the image processing apparatus; and
a change unit configured to change a display position where the combined image is displayed on a display unit in at least one of a horizontal and a vertical direction of the display unit based on information about a position and an orientation of the image display apparatus when the received combined image is displayed on the display unit and information about a position and an orientation of the image display apparatus when the imaging unit has captured the image, wherein, on the display unit, an additional image is displayed in a portion outside the combined image of which display position is changed by the change unit, wherein the change unit changes the display position of the combined image such that a moving amount of the combined image falls within a predetermined range in at least one of the horizontal and the vertical directions of the display unit.

2. The image display apparatus according to claim 1, wherein, when the moving amount of the combined image exceeds an upper limit of the predetermined range, the change unit changes the moving amount to the upper limit and the additional image displayed on the display unit is restrained to a certain size.

3. The image display apparatus according to claim 1, wherein, when the moving amount of the combined image falls below a lower limit of the predetermined range, the change unit changes the moving amount to the lower limit and prevents the expansion of the additional image.

4. The image display apparatus according to claim 1, wherein the change unit comprises:
a calculation unit configured to calculate the moving amount of the combined image based on the information about the position and the orientation when the received combined image is displayed on the display unit and the information about the position and the orientation of the image display apparatus when the imaging unit has captured an image; and
a movement unit configured to move the display position of the combined image relative to the display unit based on the calculated moving amount,
wherein, when the calculated moving amount is out of the predetermined range, the calculation unit changes the moving amount such that the moving amount falls within the predetermined range.

5. The image display apparatus according to claim 1, wherein the change unit comprises a calculation unit configured to calculate a difference between the position and the orientation when the received combined image is displayed on the display unit and the position and the orientation when the imaging unit has captured an image, based on an association between the captured image and the received combined image.

6. The image display apparatus according to claim 5, wherein the association between the captured image and the received combined image is performed through an identifier embedded in an image header or an image.

7. The image display apparatus according to claim 1, wherein the change unit changes the display position of the combined image such that a difference in moving amount between the combined image in a last frame and the combined image in a current frame falls within a predetermined range in at least one of the horizontal and the vertical directions of the display unit.

8. The image display apparatus according to claim 1, wherein, when the change unit determines that a time period since the imaging unit has captured an image until the display unit displays the image exceeds a predetermined time period, the change unit changes the display position of the combined image relative to the display unit in at least one of the horizontal and the vertical directions of the display unit based on the information about the position and the orientation when the received combined image is displayed on the display unit, and information about the position and the orientation of the image display apparatus before a predetermined time period.

9. The image display apparatus according to claim 1, wherein the predetermined range differs between the horizontal and the vertical directions.

10. The image display apparatus according to claim 1, wherein the predetermined range can be changed by a user of the image display apparatus.

11. The image display apparatus according to claim 1,
wherein the imaging unit comprises an imaging optical system,
wherein the display unit comprises a display optical system, and
wherein the image display apparatus comprises:
a first correction unit configured to correct an image captured by the imaging unit based on optical characteristics of the imaging optical system;

a generation unit configured to generate the combined image by performing at least one of deformation and movement on the image corrected by the first correction unit based on the information about the position and the orientation; and a second correction unit configured to correct the generated combined image based on optical characteristics of the display optical system.

12. The image display apparatus according to claim 11, wherein the generation unit generates the combined image based on variation of the position and the orientation since the imaging unit has captured an image until the display unit displays the display image.

13. The image display apparatus according to claim 12, wherein the generation unit uses a predetermined fixed value as a time period since the imaging unit has captured an image until the display unit displays the combined image.

14. The image display apparatus according to claim 12, further comprising a measurement unit configured to measure a processing time corresponding to a time period since the imaging unit has captured an image until the display unit displays the combined image, wherein, based on the measured time, the generation unit determines a time period since the imaging unit has captured an image until the display unit displays the display image.

15. The image display apparatus according to claim 11, further comprising a combination unit configured to combine the image corrected by the first correction unit with a virtual image to generate a combined image, wherein the generation unit generates the combined image by performing at least one of deformation and movement on the combined image.

16. The image display apparatus according to claim 11, further comprising a detection unit that detects the position and the orientation in each of a roll, a pitch, and a yaw of the image display apparatus.

17. The image display apparatus according to claim 1, wherein the additional image is a black plain area.

18. An image display apparatus comprising:
a imaging unit configured to capture an image of a real space;
a transmission unit configured to transmit the captured image to an image processing apparatus;
a reception unit configured to receive from the image processing apparatus a combined image generated based on the captured image and a virtual image by the image processing apparatus; and
a change unit configured to change a display position where the combined image is displayed on a display unit in at least one of a horizontal and a vertical direction of the display unit based on information about a position and an orientation of the image display apparatus when the received combined image is displayed on the display unit, and information about a position and an orientation of the image display apparatus when the imaging unit has captured the image, wherein, on the display unit, an additional image is displayed in a portion outside the combined image of which display position is changed by the change unit,
wherein the change unit changes the display position of the combined image such that a difference in moving amount between the combined image in a last frame and the combined image in a current frame falls within a predetermined range in at least one of the horizontal and the vertical directions of the display unit.

19. The image display apparatus according to claim 18, wherein the additional image is a black plain area.

20. An image processing apparatus connected to an image display apparatus comprising an imaging unit, having an imaging optical system, for capturing an image of a real space, a detection unit for detecting a position and an orientation of the image display apparatus, and a display unit, having a display optical system, for displaying a display image, the image processing apparatus comprising:
a first correction unit configured to correct the image captured by the imaging unit based on optical characteristics of the imaging optical system;
a generation unit configured to generate the display image by performing at least one of deformation and movement on the image corrected by the first correction unit based on the position and the orientation of the image display apparatus detected by the detection unit, wherein, on the display unit, an additional image is displayed in a portion outside the image deformed or moved by the generation unit; and
a second correction unit configured to correct the generated display image based on optical characteristics of the display optical system.

21. An image display method comprising:
capturing an image of a real space;
transmitting the captured image to an image processing apparatus;
receiving from the image processing apparatus a combined image generated based on the captured image and a virtual image by the image processing apparatus; and
changing a display position where the combined image is displayed on a display unit in at least one of a horizontal and a vertical direction of the display unit based on information about a position and an orientation of the image display apparatus when the received combined image is displayed on the display unit, and information about a position and an orientation of the image display apparatus when the imaging unit has captured the image, wherein, on the display unit, an additional image is displayed in a portion outside the combined image of which display position is changed by the change unit,
wherein the display position of the combined image is changed such that a moving amount of the combined image falls within a predetermined range in at least one of the horizontal and the vertical directions of the display unit.

22. An image display method comprising:
capturing an image of a real space;
transmitting the captured image to an image processing apparatus;
receiving from the image processing apparatus a combined image generated based on the captured image and a virtual image by the image processing apparatus; and
changing a display position where the combined image is displayed on a display unit in at least one of a horizontal and a vertical direction of the display unit based on information about a position and an orientation of the image display apparatus when the received combined image is displayed on the display unit, and information about a position and an orientation of the image display apparatus when the imaging unit has captured the image, wherein, on the display unit, an additional image is displayed in a portion outside the combined image of which display position is changed,
wherein the display position of the combined image is changed such that a difference in moving amount between the combined image in a last frame and the combined image in a current frame falls within a predetermined range in at least one of the horizontal and the vertical directions of the display unit.

23. An image processing method in an image processing apparatus connected to an image display apparatus comprising an imaging unit, having an imaging optical system, for capturing an image of a real space, a detection unit for detecting a motion of the image display apparatus, and a display unit, having a display optical system, for displaying a display image, the image processing method comprising:
    correcting the image captured by the imaging unit based on optical characteristics of the imaging optical system;
    generating the display image by performing at least one of deformation and movement on the corrected image based on the motion of the image display apparatus detected by the detection unit, wherein, on the display unit, an additional image is displayed in a portion outside the image which is deformed or moved; and
    correcting the generated display image based on optical characteristics of the display optical system.

24. A non-transitory storage medium storing a program for causing a computer to execute an image processing method in an image processing apparatus connected to an image display apparatus comprising an imaging unit, having an imaging optical system, for capturing an image of a real space, a detection unit for detecting a motion of the image display apparatus, and a display unit, having a display optical system, for displaying a display image, the image processing method comprising:
    correcting the image captured by the imaging unit based on optical characteristics of the imaging optical system;
    generating the display image by performing at least one of deformation and movement on the corrected image based on the motion of the image display apparatus detected by the detection unit, wherein, on the display unit, an additional image is displayed in a portion outside the image which is deformed or moved; and
    correcting the generated display image based on optical characteristics of the display optical system.

* * * * *